(12) United States Patent
Tibrewala et al.

(10) Patent No.: US 11,574,298 B2
(45) Date of Patent: Feb. 7, 2023

(54) SYSTEMS AND METHODS FOR CONFIGURATION INFORMATION AUTOFILL AT A BROWSER LINKED WITH USER ACCOUNTS

(71) Applicant: PAYPAL, INC., San Jose, CA (US)

(72) Inventors: Rachna Tibrewala, San Jose, CA (US); Darshankumar Bhadrasinh Desai, Fremont, CA (US); Dinesh Agnello Gomes, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 159 days.

(21) Appl. No.: 16/996,562

(22) Filed: Aug. 18, 2020

(65) Prior Publication Data
US 2022/0058617 A1    Feb. 24, 2022

(51) Int. Cl.
*G06F 40/174*   (2020.01)
*G06Q 20/34*    (2012.01)
(Continued)

(52) U.S. Cl.
CPC ............ *G06Q 20/351* (2013.01); *G06F 7/58* (2013.01); *G06F 9/547* (2013.01); *G06F 40/174* (2020.01); *G06Q 10/10* (2013.01); *G06Q 20/354* (2013.01); *G06Q 20/385* (2013.01); *G06Q 20/3829* (2013.01); *G06Q 20/401* (2013.01); *G06Q 20/4016* (2013.01); *G06Q 20/4018* (2013.01);
(Continued)

(58) Field of Classification Search
CPC .... G06Q 20/351; G06Q 10/10; G06Q 20/354; G06Q 20/3829; G06Q 20/385; G06Q 20/401; G06Q 20/4016; G06Q 20/4018; G06Q 2220/00; G06F 7/58; G06F 9/547; G06F 40/174; H04L 9/3213; H04L 9/3234; H04L 63/083; H04L 67/141; H04L 67/146; H04L 67/24; H04L 67/306; H04L 2209/56; H04L 9/0891
See application file for complete search history.

(56) References Cited

U.S. PATENT DOCUMENTS 6,088,797 A  *  7/2000  Rosen ................... H04L 9/3263
                                                    713/173
8,768,838 B1 *  7/2014  Hoffman ................ G06Q 40/00
                                                    705/72
(Continued)

OTHER PUBLICATIONS

International Search Report and Written Opinion for Application No. PCT/US2021/046183 dated Nov. 22, 2021, 18 pages.

*Primary Examiner* — Patrick McAtee
*Assistant Examiner* — Nakia Leffall-Allen
(74) *Attorney, Agent, or Firm* — Haynes and Boone LLP

(57) ABSTRACT

There are provided systems and methods for a payment information autofill mechanism that links a browser application with a user account such that a payment page at the browser application can be automatically filled based on the link. Specifically, the autofill mechanism establishes a link between a browser application running on a user device and a user account associated with the user that is stored at the server. When the user engages with the browser application to conduct a transaction on a merchant website, an application programming interface (API) call can be made to retrieve user virtual card information for automatically populating the payment data fields at the transaction page.

20 Claims, 20 Drawing Sheets

(51) Int. Cl.

| | |
|---|---|
| *H04L 9/40* | (2022.01) |
| *H04L 9/32* | (2006.01) |
| *G06Q 10/10* | (2012.01) |
| *G06Q 20/38* | (2012.01) |
| *G06Q 20/40* | (2012.01) |
| *G06F 7/58* | (2006.01) |
| *H04L 67/306* | (2022.01) |
| *H04L 67/141* | (2022.01) |
| *H04L 67/146* | (2022.01) |
| *G06F 9/54* | (2006.01) |
| *H04L 67/54* | (2022.01) |

(52) U.S. Cl.
CPC .......... *H04L 9/3213* (2013.01); *H04L 9/3234* (2013.01); *H04L 63/083* (2013.01); *H04L 67/141* (2013.01); *H04L 67/146* (2013.01); *H04L 67/306* (2013.01); *H04L 67/54* (2022.05); *G06Q 2220/00* (2013.01)

(56) References Cited

U.S. PATENT DOCUMENTS

| | | |
|---|---|---|
| 2008/0082924 A1 | 4/2008 | Pally |
| 2009/0276257 A1 | 11/2009 | Draper et al. |
| 2010/0037303 A1 | 2/2010 | Sharif et al. |
| 2011/0307377 A1 | 12/2011 | Nelsen et al. |
| 2014/0278730 A1 | 9/2014 | Muhart et al. |
| 2016/0371678 A1* | 12/2016 | Shakkawar ............ G06Q 20/10 |
| 2017/0068953 A1* | 3/2017 | Kim ................... G06Q 20/3278 |

* cited by examiner

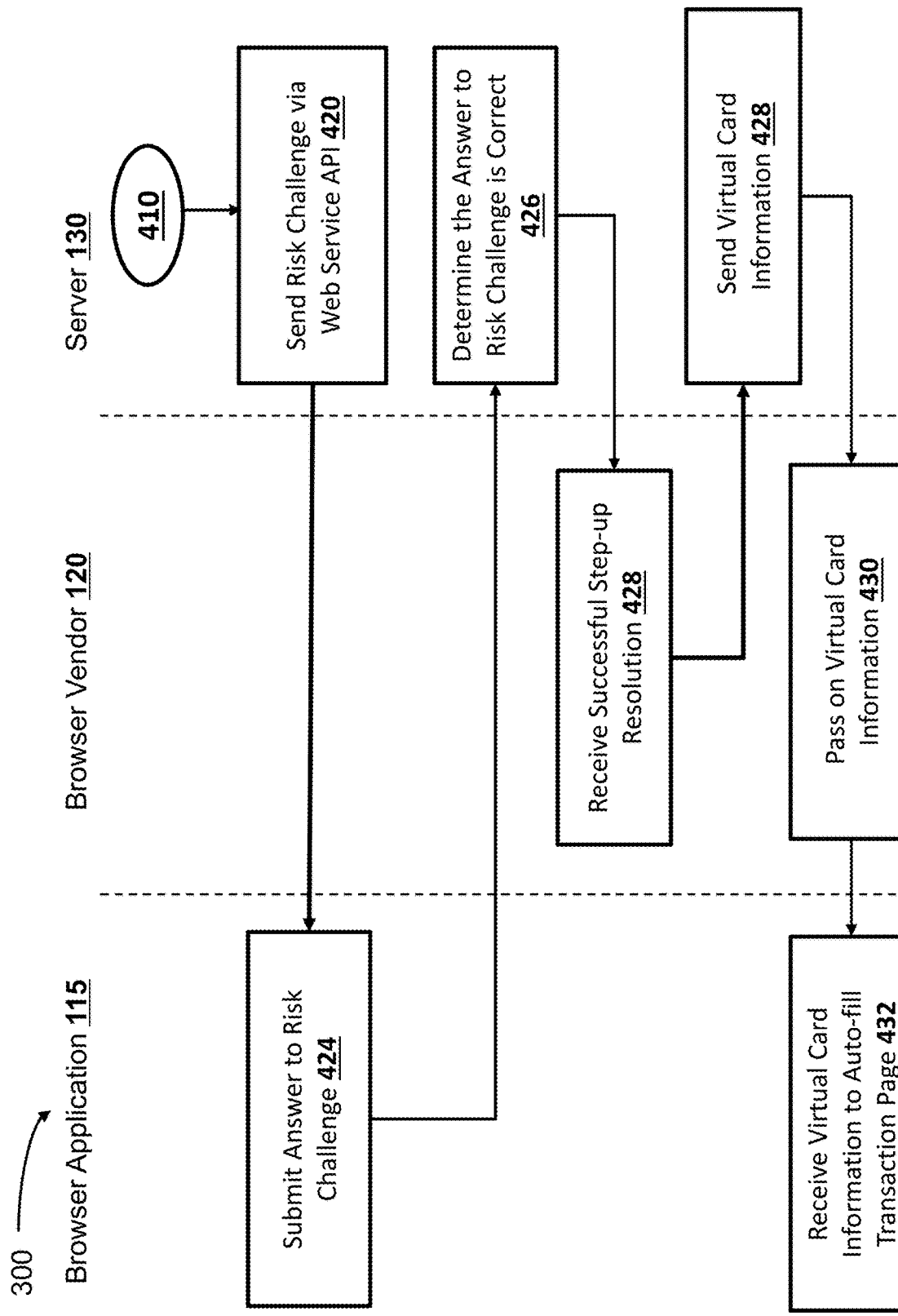

SYSTEMS AND METHODS FOR CONFIGURATION INFORMATION AUTOFILL AT A BROWSER LINKED WITH USER ACCOUNTS

TECHNICAL FIELD

The present application generally relates to virtual card management and more specifically to a payment information autofill mechanism that links a browser application with a user account such that a payment page at the browser application can be automatically filled based on the link.

BACKGROUND

Electronic commerce allows a commercial transaction to occur electronically over the Internet. For example, a merchant may provide a merchant website that lists a list of shopping items, and a user may access and browse the shopping items on the website and select one or more items to purchase. During the transaction, the user often needs to provide payment information in order to make the purchase. The payment information can be credit card information, bank card information, an Internet payment account information such as the Internet payment service provided by PAYPAL®, Inc. of San Jose, Calif., USA, and/or the like. The user usually needs to re-enter the payment information at the transaction page whenever the user is in the process of finalizing a purchase on the merchant website.

To reduce the amount of manual efforts the user need to provide card information during an electronic transaction, some merchant websites offer to save the payment information with the user profile with the merchant. In this way, when a user is logged into the merchant website to make a purchase, the merchant website may retrieve the previously stored user payment information to complete the transaction. However, the security risk of storing payment information at a merchant website can be significant. Once the merchant website is under malicious attack and the use profile database is compromised, the user payment information may be stolen.

BRIEF DESCRIPTION OF THE DRAWINGS

FIGS. 4A-4B is a flow diagram of an exemplary process for a user device to request autofill after linking the browser application running on the user device with the user account, according to an embodiment;

Figure 1:
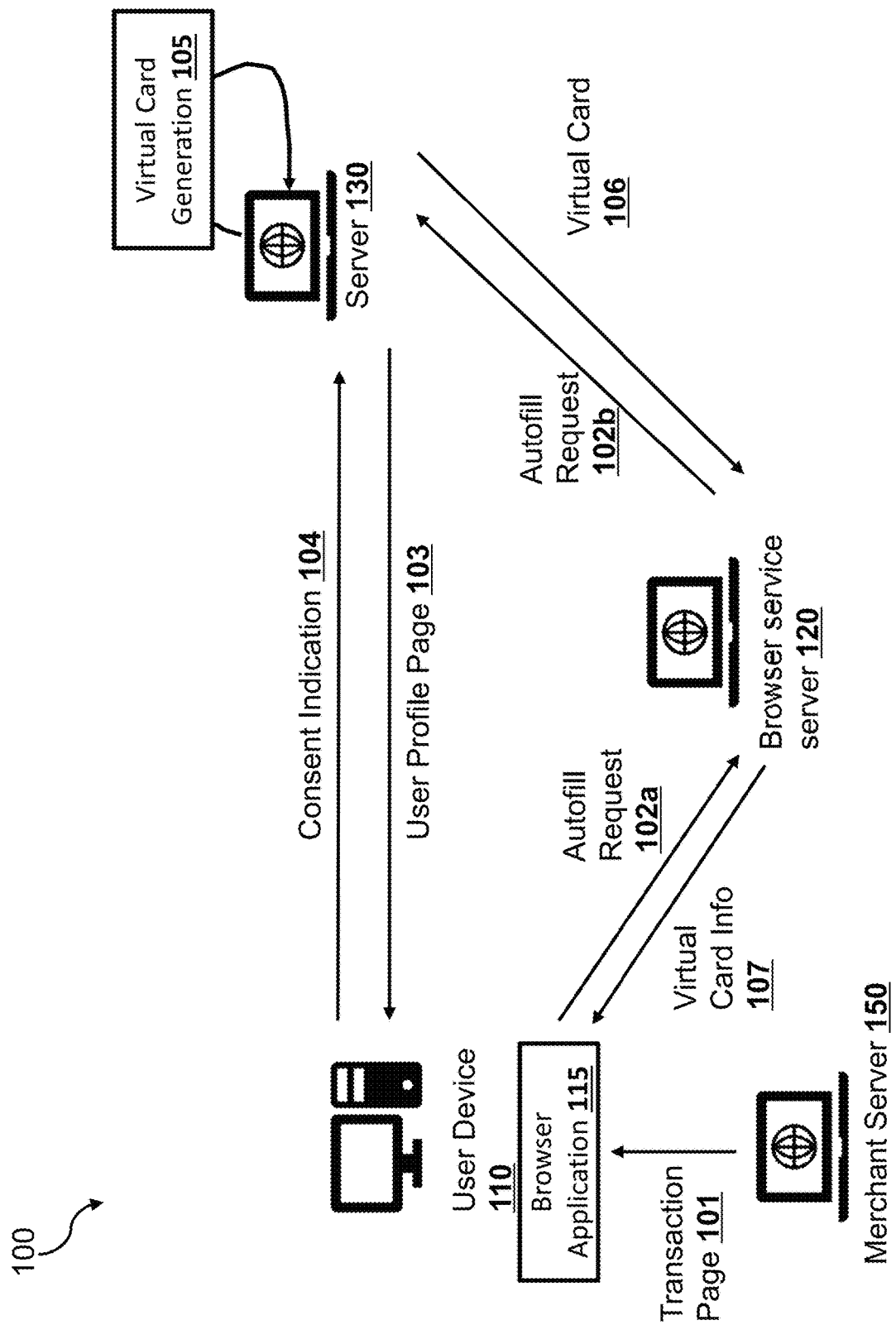
FIG. 1 is a block diagram illustrating example data flows between multiple entities for linking a browser application and a user account of a user for payment information autofill, according to one embodiment described herein.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a payment information autofill mechanism that links a browser application with a user account such that a payment transaction page at the browser application can be automatically filled based on the link. Systems suitable for practicing methods of the present disclosure are also provided.

Merchant website usually needs a user to provide payment information in order to complete an electronic purchase transaction. To streamline the user online shopping experience, some merchant websites opt to store payment information with the user profile such that the user does not need to manually enter the payment information every time when he or she is at the transaction checkout page. Some other browser applications, such as GOOGLE® CHROME®, MICROSOFT® EDGE, and/or the like, allow a user to store payment information in the browser such that the browser can retrieve the payment information when the browser is at a transaction checkout page. All these existing methods require that sensitive information such as credit card number, bank card information, and/or the like, be stored at an entity that might be rather vulnerable to attackers, e.g., a merchant server or a user device that runs the browser application, yielding a significant financial risk to the user.

In view of the need for a secured autofill mechanism, embodiments described a payment information autofill mechanism that links a browser application with a user account such that a payment page at the browser application can be automatically filled by an application programming interface (API) call for virtual card information from the user account based on the link. Specifically, the autofill mechanism creates a link between a server and a browser vendor, and in particular, between a browser application running on a user device and a user account associated with the user that is stored at the server. When the user engages with the browser application to conduct a transaction on a merchant website, an API call can be made to a browser service API at the browser vendor, which in turn sends a request to the server to retrieve user's payment information. The retrieved user payment information is then sent to the browser application running on the user device to automatically populate relevant payment information fields on the transaction page. Thus, instead of storing sensitive user payment information locally at a browser on a user device, or remotely at a merchant server, the payment information is stored at a secured server and retrieved by the browser service API on the fly during a transaction. In this way, the risk of exposing sensitive payment information to a third party during a malicious attack or information leak can be significantly reduced.

In some implementations, the server may generate a virtual card based on the user account associated with the user and the virtual card information may be provided to the browser application for autofill a transaction page. For example, the virtual card includes a generated card number representing a user account associated with the user, such as a PAYPAL® account. Once an account API of the server is linked with a browser service API of the browser vendor, virtual card information can be provided to a browser application from the account API via the browser service API.

In some implementation, the virtual card information, such as a 16-digit virtual card number, a 3-digit card security code, and/or the like, may be dynamically generated per each transaction (e.g., per each API call to retrieve virtual card information from the browser service API). For example, the server may dynamically generate a virtual card number using a random number generator when called upon to provide virtual card information to a browser service API for autofill a transaction page, and the virtual card number may vary from transaction to transaction. In this way, the dynamic virtual card payment information further strengthens the security of the user account stored at the server.

FIG. 1 is a block diagram 100 illustrating example data flows between multiple entities for linking a browser application and a user account of a user for payment information autofill, according to one embodiment described herein. Diagram 100 shows a user device 110, a browser service server 120, a merchant server 150 and a server 130, and the interactions therebetween.

The user 110 may be a human user operating a user device, such as a computer, a Smartphone, a tablet computer, and/or the like. The user 110 may be any of an automatic agent that may communicate with another device through a communication network. For example, the automatic agent may be a third-party application that enables in-app purchase, which may automatically place a purchase order with an online merchant.

The merchant server 150 may be a server that hosts and/or implements functionality of an online shopping website that is accessible by the user device 110. For example, the merchant server 150 may be a server hosting and/or implementing functionality of AMAZON.COM®, EBAY.COM®, BESTBUY.COM®, and/or the like. In one implementation, the merchant server 150 may provide a transaction page 101 to the user device 110, which may be displayed at a browser application 115 running on the user device 110.

To proceed with payment on the transaction page, the user device 110 may opt to send an autofill request 102a via the browser application. The browser service server 120 may be a server that may communicate with the user device 110 and the server 130. For example, the browser vendor of the browser service server 120 may be GOOGLE® CHROME®, MICROSOFT® EDGE, and/or the like. The autofill request 102a may be sent to the browser service server 120, which may in turn forward the autofill request 102b to the server 130 to retrieve financial payment account information.

The server 130 may be located remotely to the browser service server 120 and/or the merchant server 150. The server 130 may store a user account and may process a financial transaction using the user account information. For example, the server 130 may be a server hosted by PAYPAL®, Inc. of San Jose, Calif., USA, and/or the like. In some implementations, the server 130 includes a webservice API that facilitate communication with a web service, e.g., WWW.PAYPAYL.COM. For example, upon receiving an autofill request 102b, the server 130 may determine whether a link between the browser application on the user device 110 and the user account of the user is previously established. When such link has not been previously established, the server 130 may then send, via the web service API, a request to setup autofill at the user profile with the web service, e.g., at a user profile page 103 after the user logs into his or her account at WWW.PAYPAL.COM, on the user device 110. The user device 110 may in turn submit a consent indication 104 to setup autofill. The consent indication 104 is sent back to the server 130, which authorizes the server 130 to connect and link the user account with browser application 115.

The server 130 may generate a virtual card at a virtual card generator module 105, based on the user account stored at the server 130. The virtual card generation 105 may include generating a 16-digit card number, payment address, a card security code, and/or the like. The virtual card information 106 may be sent to the browser service server 120, e.g., via a browser service API at the server 150. The browser service server 120 may then pass on the virtual card information 107 to the browser application 115 running on the user device 110, such that the transaction page 101 can be automatically populated with card payment information.

Thus, as shown at diagram 100, the user device 110 may autofill the transaction page 101 with payment information such as virtual card information 107 via a link between a user account stored at the server 130 and the browser application 115. The virtual card information 107 is not stored at the merchant server 150, or by the cookies or extension of the browser application 115. Instead, after the link between the user account stored at the server 130 and the browser application 115 is established, the user device 110 may dynamically retrieve the virtual card information 107 during a transaction to autofill the transaction page 101. For example, the virtual payment information is retrieved on demand, e.g., when an online purchase transaction with a merchant webpage reaches the stage of a payment page when payment information is demanded to complete a transaction. In this way, the virtual card information is stored at the secured server 130, and only provided to the browser application during a transaction. When the merchant server 150 or the user device 110 is under attack, the virtual card information at the server 130 is not compromised.

Figure 2:
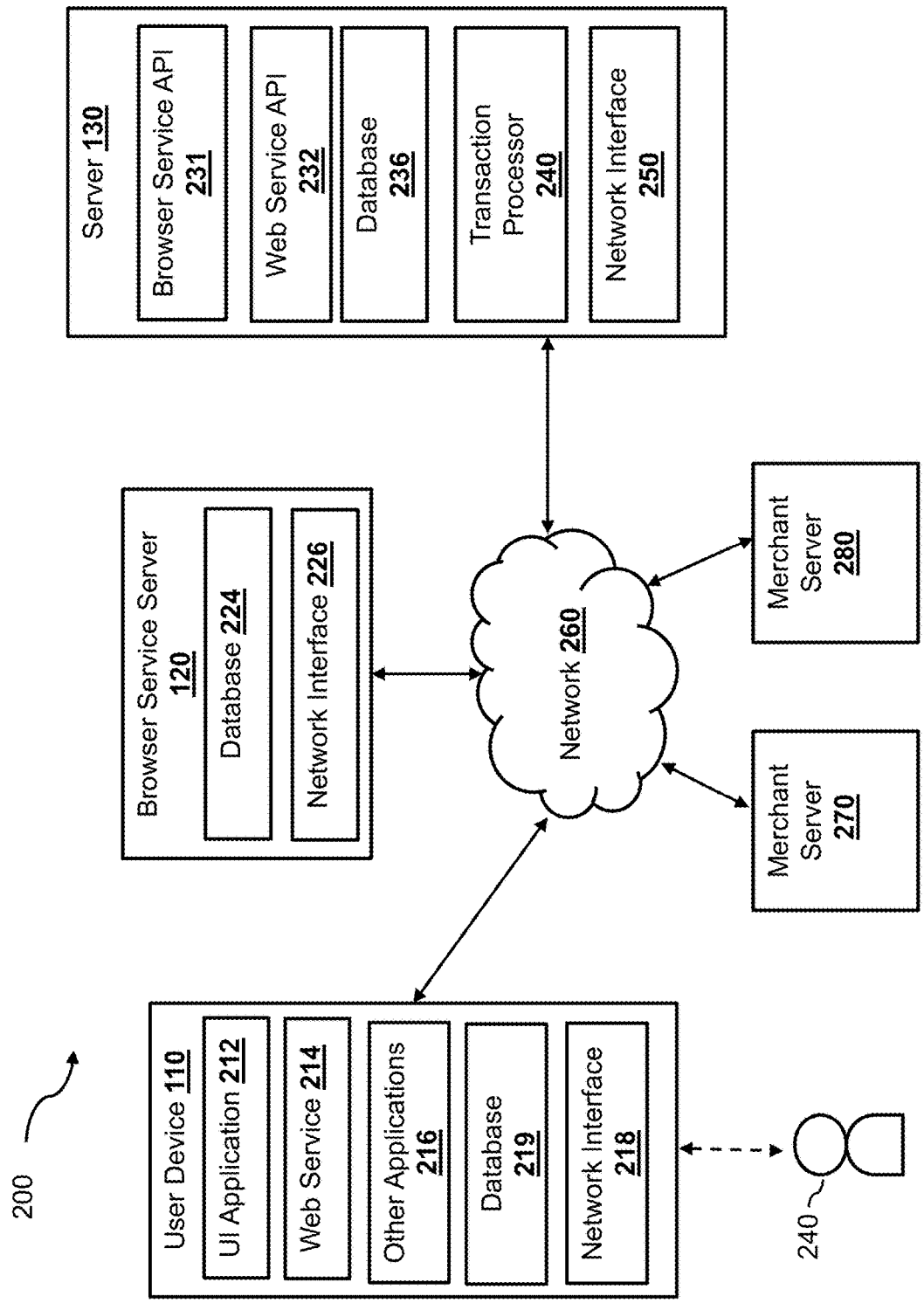
FIG. 2 is a block diagram of a networked system suitable for implementing the processes described in FIG. 1 and other embodiments described herein, according to an embodiment.

FIG. 2 is a block diagram 200 of a networked system suitable for implementing the processes described in FIG. 1 and other embodiments described herein, according to an embodiment.

In one embodiment, block diagram 200 shows a system including the user device 110 (which may be similar to user device 110 in FIG. 1) operated by user 240, browser service server 120, merchant servers 270 and 280 (each of which may implement merchant server 150 in FIG. 1), server 130, and other forms of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 2 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

The user device 110, browser service servers 120, merchant servers 270 and 280, and the server 130 may communicate with each other over a network 260. User device 110 may be utilized by a user 240 to access the various features available for user device 110, which may include processes and/or applications associated with the browser service server 120 to register for service, e.g., to setup an autofill request with the server 130, to call for autofill during a purchase transaction with merchant servers 270 or 280, and/or the like.

User device 110, browser service server 120, and server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 110 may be implemented as a communication device that may utilize appropriate hardware and software configured for wired and/or wireless communication with browser service server 120 and/or server 130. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 of FIG. 2 contains a user interface application 212, a web service application 214, and other applications 216, which may correspond to executable processes, procedures, and/or applications with associated hardware. In other embodiments, user device 110 may include additional or different modules having specialized hardware and/or software as required.

The web service application 214 may correspond to one or more processes to execute modules and associated devices of user device 110 to interact with a service provider or other online entity. For example, the web service application 214 may be used to access and display a transaction page hosted by merchant server 270 or 280. The web service application 214 may be used to perform actions and/or interactions with browser service server 120, including browsing data and navigating between data, as well as processing electronic transactions and performing other data processing operations. The web service application 214 may correspond to a general browser application configured to retrieve, present, and communicate information over the Internet (e.g., utilize resources on the World Wide Web) or a private network. For example, the web service application 214 may provide a web browser, which may send and receive information over network 260, including retrieving website information, presenting the website information to the user, and/or communicating information to the website. However, in other embodiments, web service application 214 may include a dedicated application such as a mobile application running on the user device 110, which may be configured to provide services through the application. Web service application 214 may generate interaction data with browser service server 120 that indicates a request to set up autofill. Additionally, the web service application 214 may display a merchant website, a user account profile via the web service sponsored by the server 130, at the user device 110.

In various embodiments, user device 110 includes other applications 216 as may be desired in particular embodiments to provide features to user device 110. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. Other applications 216 may also include other media viewing applications to consume media content on user device 110. Other applications 216 may further include a tracking application to monitor data usage on the user device 110. Other applications 216 may include device interfaces and other display modules that may receive input and/or output information. For example, other applications 216 may contain software programs, executable by a processor, including a graphical user interface (GUI) configured to provide an interface to the user.

User device 110 may further include database 219 stored in a transitory and/or non-transitory memory of user device 110, which may store various applications and data and be utilized during execution of various modules of user device 110. Database 219 may store data tracking processes and operations, such as cookies or code snippets, which may be stored in database 219 with tracked user and/or device data. In some embodiments, database 219 may be local to user device 110. However, in other embodiments, database 219 may be external to user device 219 and accessible by user device 110, including cloud storage systems and/or databases that are accessible over network 260.

User device 110 includes at least one network interface component 218 adapted to communicate with browser service server 120 and/or server 130. In various embodiments, network interface component 218 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Browser service server 120 may correspond to a server that maintains updates, user profile registration, error reporting, and/or other maintenance tasks with the browser application such as the web service application 214 on user device 110. Browser service server 120 of FIG. 2 contains a database 224 and a network interface 226. Database 224 may be used to store user information, browser upgrade information, browser error report information, and/or the like. For example, the database 224 may store user account and/or profile information such as user name, address, browsing history, activity logs with the web service application 214, and/or the like. The database 224 may be implemented by one or more relational database, distributed databases, cloud databases, and/or the like.

Browser service server 120 includes at least one network interface component 226 adapted to communicate with user device 110 and/or server 130. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

The server 130 may be housed with, or separately with a transaction processor 240, which may be maintained, for example, by an online service provider, which may provide online transaction processing services for payment on user device 110, as well as manage payment accounts used to send and receive payments. In this regard, the server 130 includes one or more processing applications which may be configured to interact with user device 110 and/or browser service server 120 to facilitate transaction processing for purchase from a merchant website that is hosted by merchant server 270 and/or 280, on user device 110. In one example, the server 130 may be hosted by or partnered by PAYPAL®, Inc. of San Jose, Calif., USA. However, in other embodiments, the server 130 may be maintained by or include another type of service provider, which may provide payment services to a plurality of users.

The server 130 of FIG. 2 contains a browser service API 231 configured to control communication with the browser service server 120, a web service API 232 configured to control communication with a website (e.g., WWW.PAYPAL.COM) hosted by the server 130, a database 236, a transaction processor 240 and a network interface 250. The browser service API 231 and/or the web service API 232 may correspond to executable processes, procedures, and/or applications with associated hardware. In other embodiments, the browser service API 231 and/or the web service API 232 may each correspond to a REST based API.

The browser service API 231 may be a computing interface between the server 130 and the browser service server 120. The browser service API 231 may define interactions between the server 130 and the browser service server 120, such as types of API calls the server 130 may make (e.g., a link request to link the browser application with a user account), how to make such API call, the data formats that should be used, the conventions to follow, and/or the like.

The web service API 232 may be a computing interface between the server 130 and the web service hosted by the server. The web service API 232 may define interactions between the server 130 and a financial service website, such as types of API calls the server 130 may make (e.g., an API call to direct a login page to the user device 110, etc.), how to make such API call, the data formats that should be used, the conventions to follow, and/or the like.

The database 236 may be stored in a transitory and/or non-transitory memory of the server 130. In various embodiments, database 236 may include account information, as well as identifiers using in providing and confirming payments for data tracking. For example, the account database 236 may be configured to store payment accounts for a user associated with user device 110 to send and receive payments, the user may provide information, including user personal and/or financial information to the server 130. Additionally, the information may include authentication information, such as a login, account name, password, PIN, or other account creation information. The user may provide a name, address, social security number, or other personal information necessary to establish an account and/or effectuate payments.

In some embodiments, database 236 may be local to the server 130. However, in other embodiments, database 236 may be external to the server 130 and accessible by the server 130, including cloud storage systems and/or databases that are accessible over network 260.

The transaction processor 240 may be housed with, or separately server 130, which may be maintained, for example, by an online service provider, which may provide online transaction processing services for payment on user device 110, as well as manage payment accounts used to send and receive payments. In this regard, the transaction processor 240 includes one or more processing applications which may be configured to interact with user device 110 and/or merchant servers 270 and 280 to facilitate transaction processing for online purchase on user device 110.

The server 130 includes at least one network interface component 250 adapted to communicate with user device 110, browser service server 120, merchant server 270 or 280 over network 260. In various embodiments, network interface component 238 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Figure 3A:
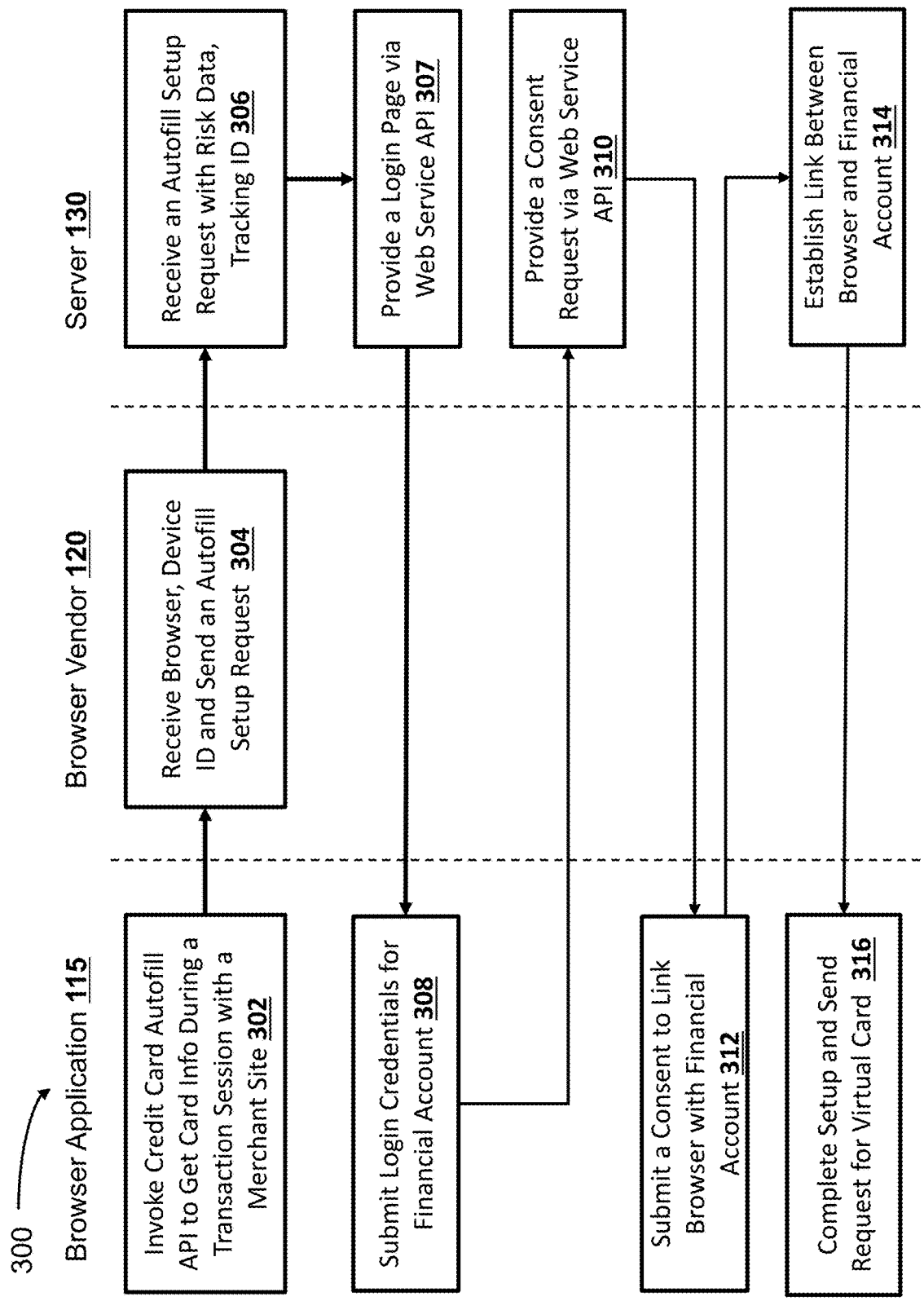
FIGS. 3A-3B is a flow diagram of an exemplary process for a user device to initiate autofill setup to link a browser application running on the user device with a user account, according to an embodiment.
Figure 3B:
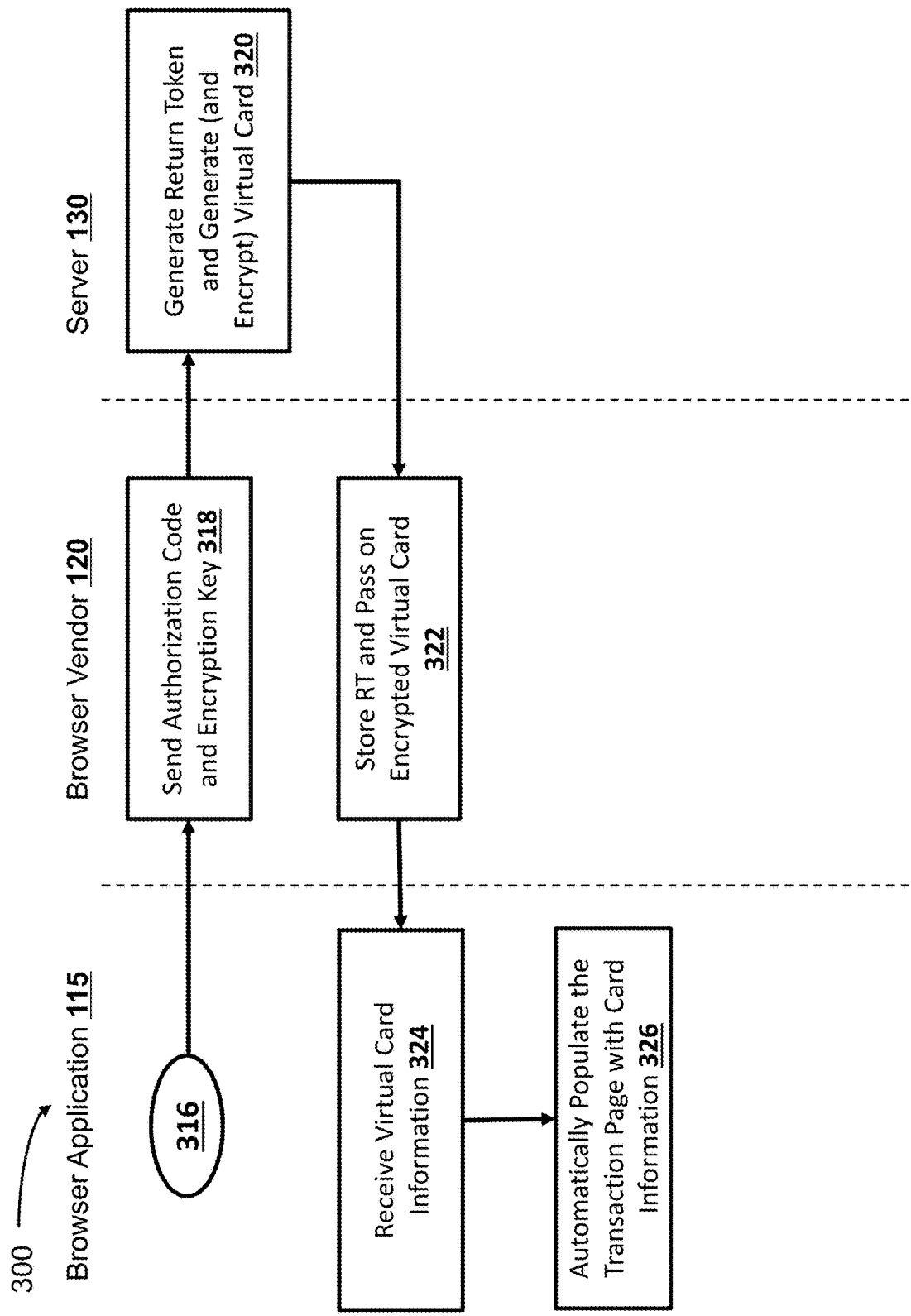

FIGS. 3A-3B is a flow diagram of an exemplary process for a user device (such as user device 110) to initiate autofill setup to link a browser application running on the user device with a user account, according to an embodiment. One or more of the processes of process 300 may be implemented, at least in part, in the form of executable code stored on non-transitory, tangible, machine-readable media that when run by one or more processors may cause the one or more processors to perform one or more of the processes. In some embodiments, process 300 may be interactively performed by a browser application 115 running on the user device 110 in FIG. 1 or the user device 110 in FIG. 2, the browser service server 120 and the server 130. It is worth noting that additional processes, steps and/or implementations may be omitted, performed in a different sequence, or combined as desired or appropriate.

Process 300 begins with step 302 where the browser application 115 may invoke a credit card autofill API to get card information during a transaction session with a merchant site. For example, a user may operate a user device to access a merchant website via the browser application 115, and at a transaction page of the merchant website, the user may opt for an autofill option (as further shown in FIG. 8B). An API call to invoke autofill may include parameters such as but not limited to the following (it is noted that the sample values in the data tables throughout the specification are for illustrative purpose only):

TABLE 1

API Parameters for Autofill Setup Request

| Parameter | Type | Sample Value | Description |
| --- | --- | --- | --- |
| operationName | String | GetVirtualPayment | Pass this value as operation name to indicate Account Linking Intent to get URL for setup |
| Scope | String | email + text + payment | URL encoded space set of scope URIs. |
| redirectUri | String | https://www.example-redirect.com | Redirect URI that Partner registered with server with the Partner Client ID while creating Partner Client Credentials |
| State | String | XXXXXXX | State parameter value that partner could use to maintain user context on partner side |
| responseType | String | return token | Response type - authorization code and id_token |
| loginHintToken | String | XXXXXXX | Base64 encoded JSON string. IDToken - JWT assertion for partner to pass partner's user session |
| jsonWebKeys | String | jsonwebkeyXXXX | Base64 encoded JSON string describing Encryption key |
| billingAgreementId | String | billingIdXXXXXXXX | Existing Billing Agreement ID, if partner has any, for this partner user. Later it can be used for online-migration from Billing Agreement to Refresh Token |
| billingPlanDetails | String | Billing Plan Details | JSON string containing details for Billing Plan that partner has with server. |
| merchantCustomData | String | merchantdataXXXXXX | This is an optional parameter for merchant to pass any custom data |

At step 304, the browser service server 120 may receive browser ID, device ID, and/or other data associated with the browser session of the browser application 115 and send an autofill setup request to the server 130. For example, the browser service server 120 may send a POST message to the server 130 indicating risk data associated with the browser application.

At step 306, the server 130 may receive the autofill setup request with risk data. For example, the server 130 may obtain a tracking ID for the browser application from the risk data, and then past it to a virtual card generation module as a client metadata ID. The server 130 may in turn provide the tracking ID to the browser service server 120 in response to the POST message, together with additional data such as but not limited to the client metadata ID, a redirect URL, a response type, a JSON web token (JWT) assertion, and/or the like. The browser service server 120 may in turn send, via a browser service API, a request to set up the user account with the server, which may in turn authorize the request and create client context for the browser service server 120.

At step 307, the server 130 may generate an API call to a web service API to provide a login page to the user account, e.g., for a web server of the server 130 to generate a login screen, e.g., PAYPAL® login page, at the browser application 115.

At step 308, the browser application 115 may submit login credentials for the user account. For example, the browser application 115 may receive user input of email and password to log into the user's PAYPAL® account. In response to successful user login, at step 310, the server 130 may provide a consent request via web service API, which may be displayed at the browser application 115. At step 312, the browser application 115 may submit a consent to link the browser with the user's user account to the server 130, via the web service API.

At step 314, upon receiving the consent indication, the server 130 may establish a link between the browser application and the user account of the user, e.g., via the browser service API at the server 130. For example, the web service API of the server 130 may redirect back to the browser application with authorization code and a state parameter upon receiving the user consent to link account.

At step 316, the browser application 115 may in turn complete the setup with web service of the server 130, and send a request for virtual card. For example, the browser application 115 may send the request for virtual card to the browser service server 120, which may in turn pass on the request with an authorization code, and/or an encryption key via the browser service AI to the server 130, e.g., at step 318. For instance, the request sent by the browser service server 120 to get virtual card may include the following parameters:

TABLE 2

API Parameters for Get Virtual Card

| Parameter | Type | Sample Value | Description |
| --- | --- | --- | --- |
| operationName | String | getVirtualPayment | Pass this value as operation name to get Virtual Card in the response |

TABLE 2-continued

API Parameters for Get Virtual Card

| Parameter | Type | Sample Value | Description |
|---|---|---|---|
| authCode | String | authorizationcodeXXXXX | Authorization Code received from server after Consent |
| jsonWebKeys | String | webkeyXXXXXXX | Base64 encoded JSON string - describing Encryption key |

At step 320, the server 130 may associate the user account of the user with a partner ID representing the browser application 115 and generate a return token. For example, the server 130 may generate virtual card information such as a 16-digit card number, a 3 or 4-digit card security code, a user address for billing, and/or the like. In some implementations, the server 130 may dynamically generate the virtual card information, one or more of the 16-digit card number, and the 3 or 4-digit card security code, per each transaction. For example, the virtual card information may be generated using a random number generator to generate the card number, card security code, and/or the like. For another example, a hash value may be generated per each transaction, based on which the card number and/or the card security code may be retrieved from a hash table. In some implementations, when an encryption key is provider from the browser vendor, e.g., at step 318, the server 130 may generate virtual card information and encrypt the generated virtual card information.

At step 322, the browser service server 120 may receive the return token and encrypted virtual card information upon the successful virtual card generation at the server 130. For example, the response message received by the browser service server 120 including the return token may include parameters such as:

TABLE 3

API Parameters for Return Token

| Parameter | Type | Sample Value | Description |
|---|---|---|---|
| refreshToken | String | refreshTokenValueXXXXX | The refresh token, which can subsequently be used to call PayPal APIs by passing it in the PayPal-Auth-Assertion Header |
| id_token | String | tokenValueabcdefg123455 | Base64 encoded IDToken. It can contain information about PayPal user - e.g. Email Address, Firstname, Lastname |
| scopes | String | email + payments + virtualcard | Scopes granted to the Partner after the user consent |
| virtualCards | JSON | JS ON Array | JSON String containing Virtual Card details |

The browser service server 120 may in turn store the return token and pass on the virtual card information to the browser application 115. At step 324, the browser application 115 may receive the virtual card information from the browser service server 120, and may then automatically populate the transaction page with the card information, at step 326. For example, the virtual card parameters may include but not limited to:

TABLE 4

Virtual Card Parameters

| Parameter | Type | Sample Value | Description |
|---|---|---|---|
| cardNumber | String | 4526789632145896 | Virtual Credit Card Number |
| cardVerificationCode | String | 123 | CVV |
| expirationDate | String | 2022 October | Expiration Date |
| brand | String | Discover | Brand of the Virtual Credit Card |

Figure 4A:
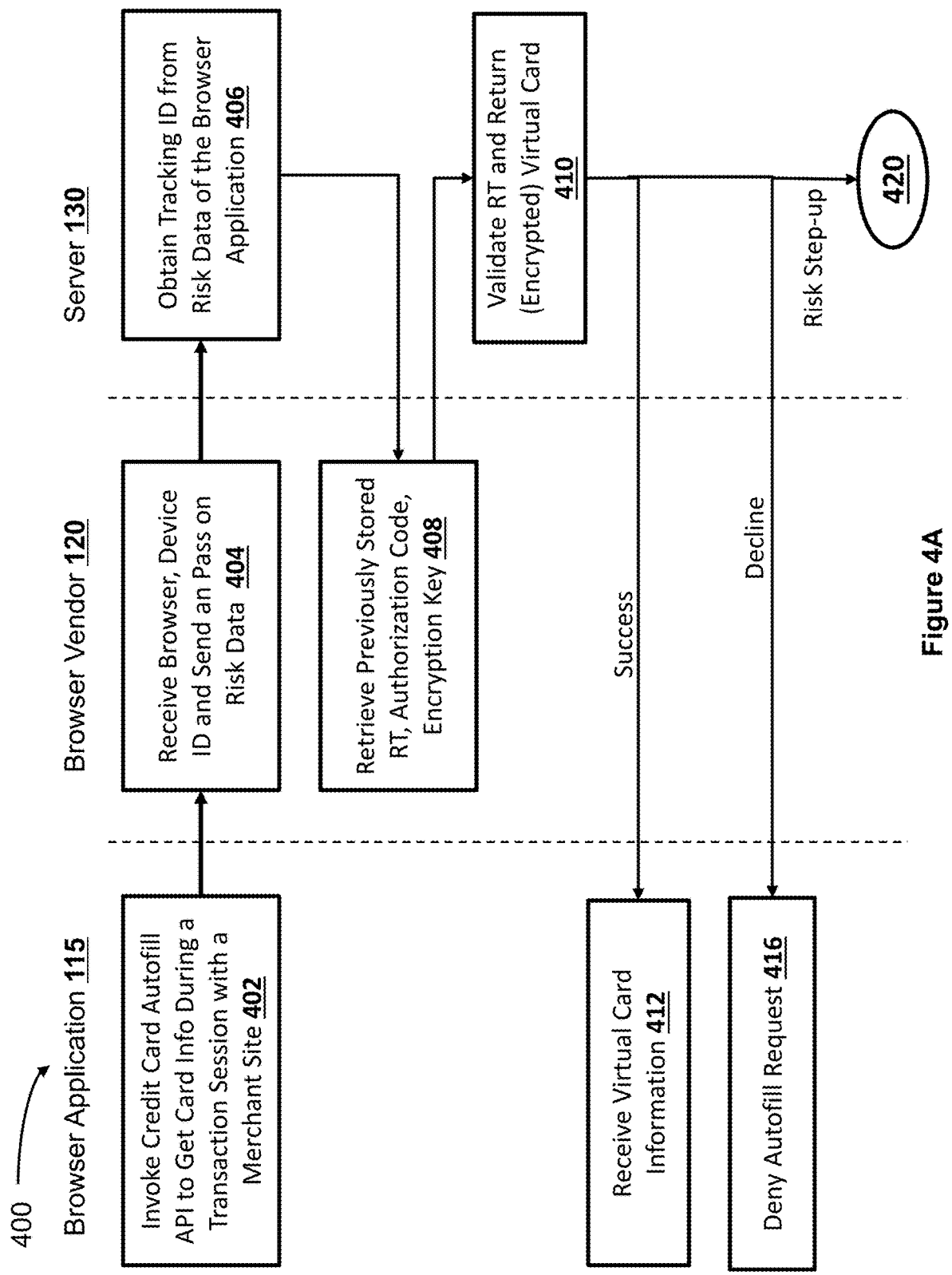

FIGS. 4A-4B is a flow diagram of an exemplary process for a user device (such as 110 in FIG. 1 or 110 in FIG. 2) to request autofill after linking the browser application running on the user device with the user account, according to an embodiment. One or more of the processes of process 400 may be implemented, at least in part, in the form of executable code stored on non-transitory, tangible, machine-readable media that when run by one or more processors may cause the one or more processors to perform one or more of the processes. In some embodiments, process 400 may be interactively performed by a browser application 115 running on the user device 110 in FIG. 1 or the user device 110 in FIG. 2, the browser service server 120 and the server 130. It is worth noting that additional processes, steps and/or implementations may be omitted, performed in a different sequence, or combined as desired or appropriate.

At step 402, the browser application 115 may invoke credit card autofill API to get card information during a transaction session with a merchant site. For example, after the link between the browser application and a user account has been established in process 300 shown in FIGS. 3A-3B, the user may engage in another online transaction, which may invoke the autofill function at the transaction page.

At step 404, the browser service server 120 may receive the browser and device data from the browser application 115, together with the autofill request. For example, the browser vendor may also generate risk data associated with the browser application based on the browser and device data. At step 406, the server 130 may receive the risk data and obtain a tracking ID of the browser application from the risk data. For example, the server 130 may receive a POST message from the browser service server 120, which contains the risk data, and may then pass the tracking ID obtained from the risk data to a virtual card generation module. The browser service server 120 may then receive the tracking ID from the server 130, and retrieve previously stored return token, authorization code, and/or an encryption key for the server 130, at step 408.

In one implementation, the browser service server 120 may send a request to get virtual card and/or return token using an authorization code. For example, parameters for the request may include, but not limited to:

TABLE 5

API Parameters for Get Virtual Card Using Authorization Code

| Parameter | Type | Sample Value | Description |
|---|---|---|---|
| operationName | String | getVirtualCard | Pass this value as operation name to get Virtual Card in the response |
| authCode | String | Code123456789 | Authorization Code received from PayPal after Consent |
| jsonWebKeys | String | Webkey1234567890 | Base64 encoded JSON string - describing Encryption key |

In one implementation, the browser service server 120 may send a request to get virtual card and/or return token using a previously stored return token (e.g., from step 322 in FIG. 3B). For example, parameters for the request may include, but not limited to:

TABLE 6

API Parameters for Get Virtual Card Using Return Token

| Parameter | Type | Sample Value | Description |
|---|---|---|---|
| operationName | String | getVirtualCard | Pass this value as operation name to get Virtual Card in the response |
| jsonWebKeys | String | webkey1234567890 | Base64 encoded JSON string - describing Encryption key |

At step 410, upon receiving a request for virtual card from the browser service server 120 containing the return token, authorization code or the encryption key, e.g., via a browser service API, the server 130 may validate the return token, and return the encrypted virtual card information. In some implementation, the server 130 may dynamically re-generate virtual card information, e.g., the 16-digit card number, and/or a card security code, and encrypt the re-generated card information before returning it to the browser service server 120.

When the validation at step 410 is successful, or the risk associated with the browser applicated is evaluated as within a low range, the server 130 may then return the virtual card information to the browser service server 120, which in turn pass the virtual card information to the browser application 115. At step 412, the browser application 115 receives the virtual card information and may automatically populate the transaction page. For example, a response from the server to return the virtual card information may include parameters such as but not limited to:

TABLE 7

Response Parameters When Authorization Code is Used in Request for Virtual Card

| Parameter | Type | Sample Value | Description |
|---|---|---|---|
| refreshToken | String | Token1234567890abcdefg | The refresh token, which can subsequently be used to call PayPal APIs by passing it, such as in the PayPal-Auth-Assertion Header |
| id_token | String | token12345678900 | Base64 encoded IDToken. It can contain information about PayPal user - e.g. Email Address, Firstname, Lastname |
| scopes | String | email + payments + virtualcard | Scopes granted to the Partner after the user consent |
| virtualCards | JSON | JSON Array | JSON String containing Virtual Card details |

TABLE 8

Response Parameters When Return Token is Used in Request for Virtual Card

| Parameter | Type | Sample Value | Description |
|---|---|---|---|
| operationName | String | getPaymentCard | Pass this value as operation name to get Virtual Card in the response |
| jsonWebKeys | String | webkey1234567890 | Base64 encoded JSON string - describing Encryption key |

When the validation at step 410 is unsuccessful, and/or when the risk associated with the browser application is assessed as being high, the server 130 may decline the virtual card request with an error code. At step 416, the autofill request may be denied at the browser application 115, e.g., based on a decline message and/or error code sent from the server 130 via the browser service server 120.

In some implementations, upon validation of the return token at step 410, the server 130 may decide to step up the risk challenge. For example, if the return token has not been updated for greater than a threshold amount of time (e.g., 7 days, 14 days, etc.), the server 130 may re-confirm with the user on the link between the user account and the browser application. For another example, the risk associated with the browser application may fall into a pre-defined range (e.g., neither low nor high) that risk step-up is required. At step 420, the server 130 may send a risk challenge to the user, e.g., via web service API. The risk challenge may be provided within the web service page of the server 130 via the browser application 115.

At step 424, the browser application 115 may submit an answer to the risk challenge, e.g., the user answers the risk challenge via the browser application 115. At step 426, the server 130 may determine that the answer to the risk challenge is correct. The browser service server 120 may then receive the answer and take over the control on the successful challenge step-up resolution, e.g., at step 428. The browser service server 120 may also send a request to get virtual card information to the server 130 upon the successful step-up resolution.

In an alternative implementation, the server 130 may send the risk challenge to the user via a different communication protocol, such as email, text message, instant message, and/or the like, and request the user to respond with an answer to the risk challenge. Upon receiving the answer to the risk challenge via email, text message, or instant message, the server 130 may proceed with step 426 in a similar manner as shown in FIG. 4B.

At step 428, the server 130 may then send the virtual card information, such as the card number, expiration date, card verification value (CVV) number or the card security code (CSC), and/or the like to the browser service server 120, e.g., via the browser service API. At step 430, the browser service server 120 may pass on the virtual card information to the browser application 115. At step 432, the browser application 115 may in turn receive the virtual card information to automatically fill the transaction page.

Figure 5:
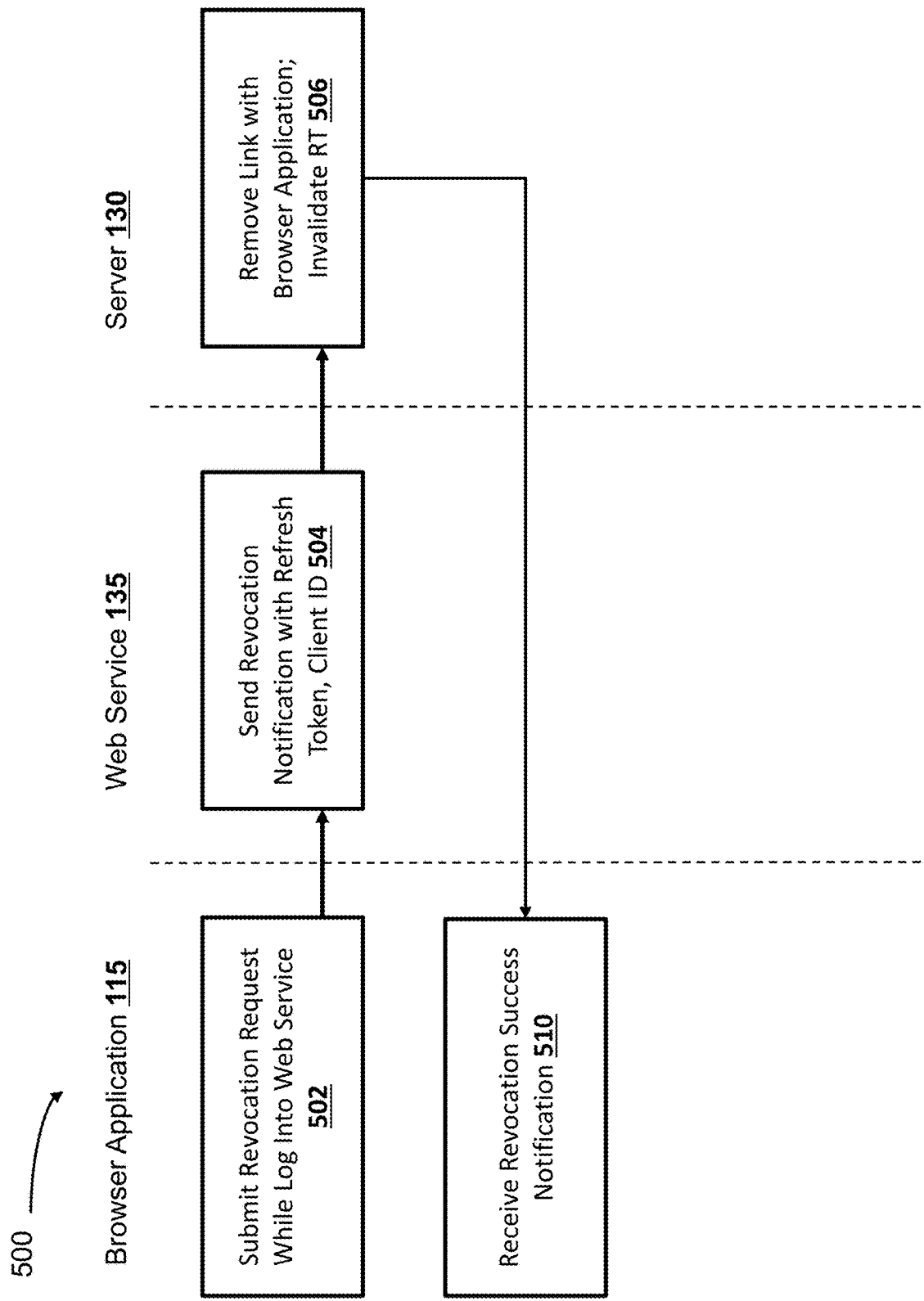
FIG. 5 is a flow diagram of an exemplary process for a user device to revoke an established link between the user account and the browser application from within a web service sponsored by the server, according to an embodiment.

FIG. 5 is a flow diagram of an exemplary process for a user device (such as user device 110) to revoke an established link between the user account and the browser application from within a web service sponsored by the server (such as server 130), according to an embodiment. One or more of the processes of process 500 may be implemented, at least in part, in the form of executable code stored on non-transitory, tangible, machine-readable media that when run by one or more processors may cause the one or more processors to perform one or more of the processes. In some embodiments, process 500 may be interactively performed by a browser application 115 running on the user device 110 in FIG. 1 or the user device 110 in FIG. 2, a web service 135 sponsored by the server 130, and the server 130. It is worth noting that additional processes, steps and/or implementations may be omitted, performed in a different sequence, or combined as desired or appropriate.

At step 502, the browser application 115 running on user device may submit a revocation request to remove the link between the user account and the browser application, while the browser application 115 is logged into the web service of the server 130 under the user account. For example, the user may log into his or her PayPal account via PAYPAL.COM, and choose a "remove link with browser" option within settings of his or her PayPal profile.

At step 504, the web service 135 sponsored by the server 130 may send the revocation notification to the server 130, e.g., via a web service API. Specifically, the revocation notification may include a previously stored return token or a refreshed token that is used to authorize the link between the user account and the browser application, a client ID, and/or the like.

At step 506, the server 130 may remove the link with the browser application by invalidating the return token previously issued to establish the link. For example, the server 130 may receive the return token from the web service 135 (e.g., PAYPAL.COM), retrieve the user account profile (e.g., the user PayPal account) that corresponds to the return token, and remove the previously created and stored return token that is associated with the user account profile.

At step 510, the browser application may receive a revocation success notification. For example, the server 130 may send the revocation success notification back to the web service 135, e.g., via the web service API, which may in turn forward the notification to the browser application. In some implementations, the notification that the linking permission is revoked may be sent to the browser vendor from the server 130.

Figure 6:
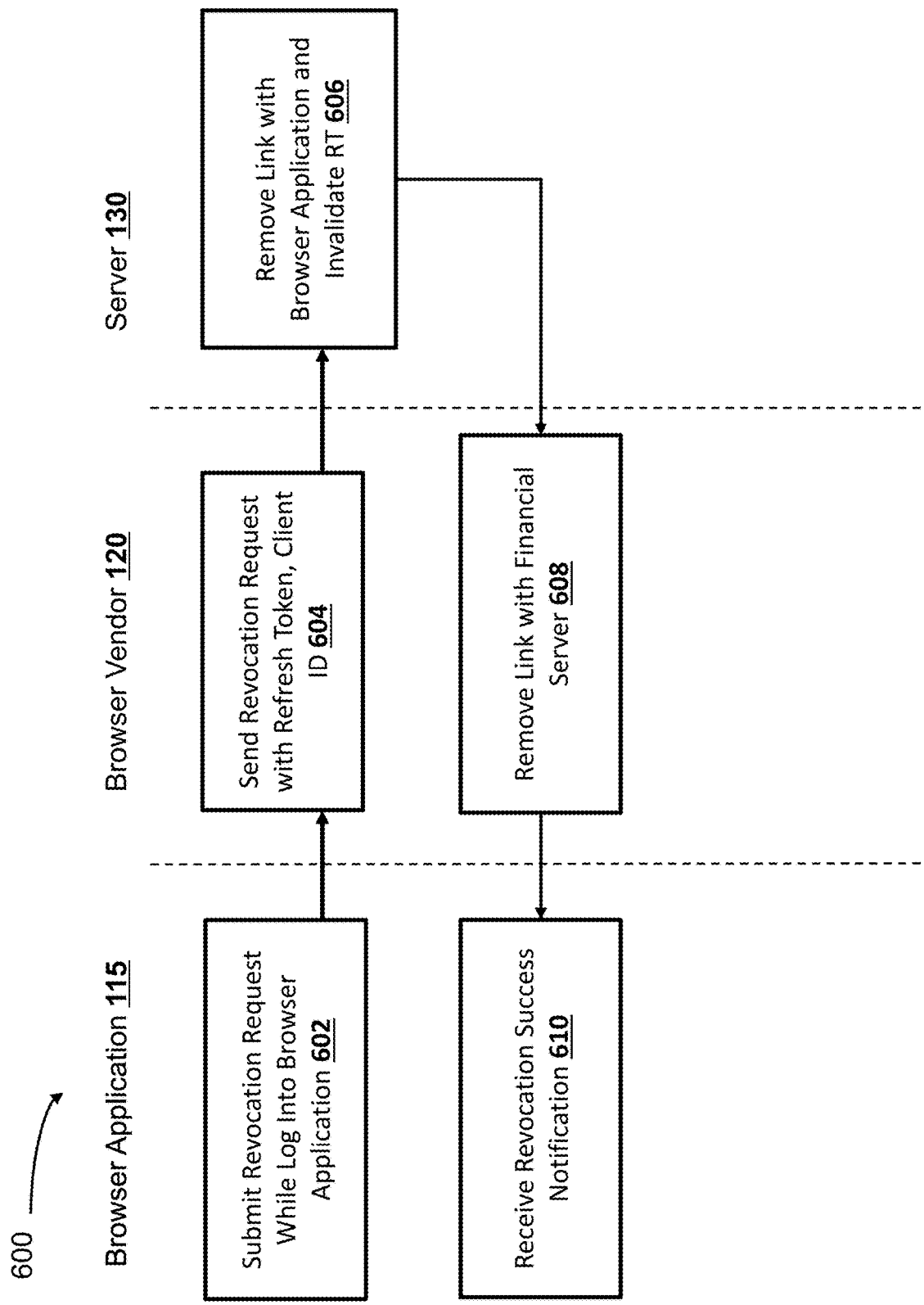
FIG. 6 is a flow diagram of an exemplary process for revoking an established link between the user account and the browser application upon user logging into the browser application, according to an embodiment.

FIG. 6 is a flow diagram of an exemplary process for revoking an established link between the user account and the browser application upon user logging into the browser application, according to an embodiment. One or more of the processes of process 600 may be implemented, at least in part, in the form of executable code stored on non-transitory, tangible, machine-readable media that when run by one or more processors may cause the one or more processors to perform one or more of the processes. In some embodiments, process 600 may be interactively performed by a browser application 115 running on the user device 110 in FIG. 1 or the user device 110 in FIG. 2, a web service 135 sponsored by the server 130, and the server 130. It is worth noting that additional processes, steps and/or implementations may be omitted, performed in a different sequence, or combined as desired or appropriate.

At step 602, the browser application 115 may submit a revocation request to the browser service server 120, while the user logs into the browser application 115. For example, the user may log into his or her GOOGLE® account using the browser application GOOGLE CHROME®, or a MICROSOFT® account while using MICROSOFT® EDGE, and/or the like. The user may choose to "remove link with PayPal" at the settings of the browser application.

At step 604, the browser service server 120 may send the revocation request, upon receiving the revocation request from the browser application 115, to the server 130, e.g., via a browser service API. Specifically, the revocation request may include a previously stored return token or a refreshed token that is used to authorize the link between the user account and the browser application, a client ID, and/or the like.

At step 606, the server 130 may remove the link with the browser application by invalidating the return token previously issued to establish the link. For example, the server 130 may receive the return token from the browser service server 120 (e.g., GOOGLE CHROME® server, MICROSOFT® EDGE server, etc.), retrieve the user account profile (e.g., the user PayPal account) that corresponds to the return token, and remove the previously created and stored return token that is associated with the user account profile.

At step 608, the browser service server 120 may receive the revocation notification, via a browser service API from the server 130, and may in turn remove the link with the server, e.g., by deleting the previously stored return token.

At step 610, the browser application may receive a revocation success notification. For example, the server 130 may send the revocation success notification back to the browser service server 120, e.g., via the browser service API, which may in turn forward the notification to the browser application.

In some implementations, the link between the browser application and the user account may be revoked in various other ways, including, but not limited to user closing or cancelling a virtual card at the web service of the server, user closing or cancelling the current virtual card and generating a new one at the web service of the server, user suspending the current virtual card temporarily at the web service of the server, and/or the like.

Figure 7:
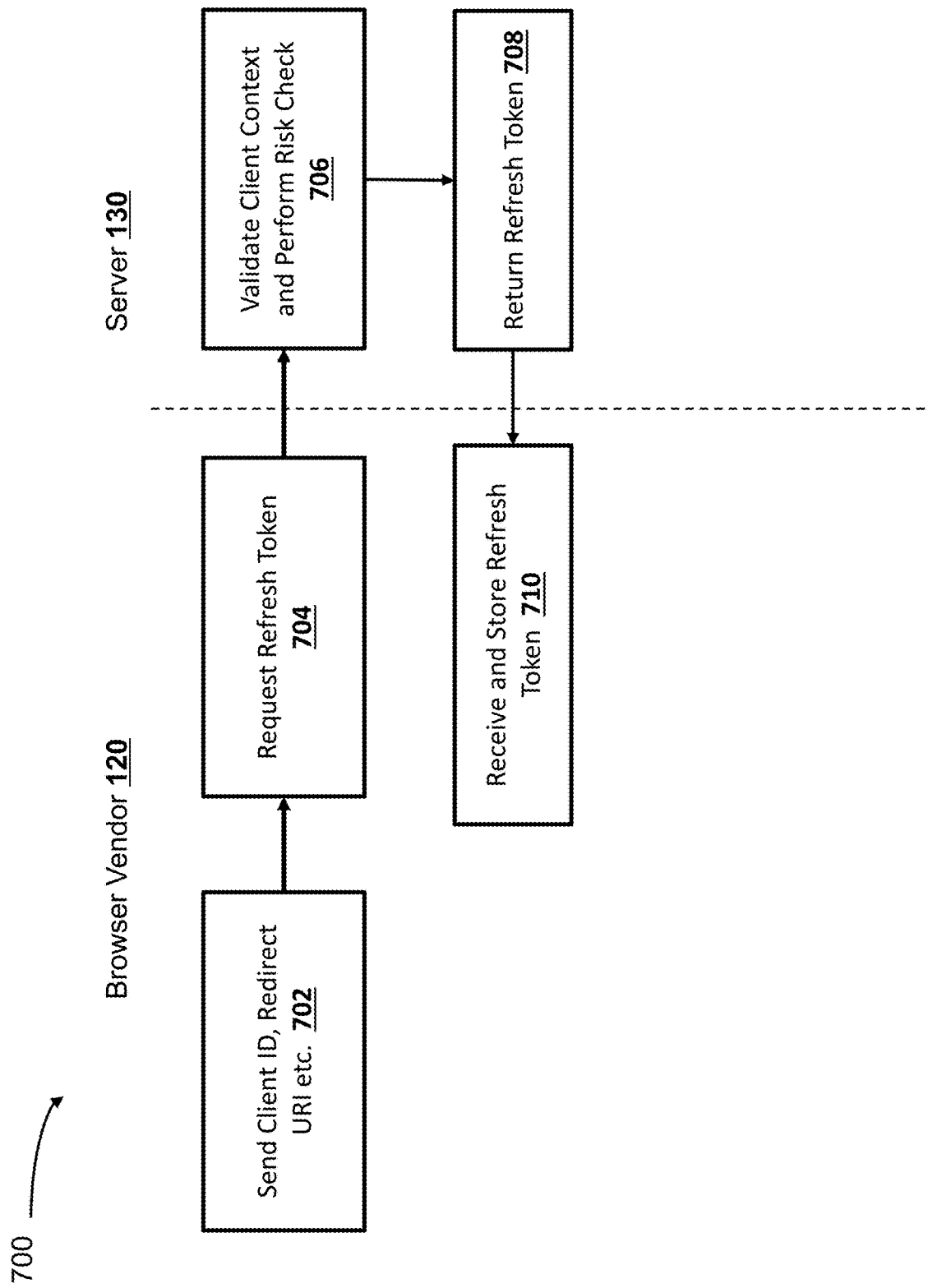
FIG. 7 is a flow diagram of an exemplary process for refreshing a token for a link between the user account and the browser application, according to an embodiment.

FIG. 7 is a flow diagram of an exemplary process for refreshing a token for a link between the user account and the browser application, according to an embodiment. One or more of the processes of process 700 may be implemented, at least in part, in the form of executable code stored on non-transitory, tangible, machine-readable media that when run by one or more processors may cause the one or more processors to perform one or more of the processes. In some embodiments, process 700 may be performed via the interaction between a browser service server 120 and the server 130. It is worth noting that additional processes, steps and/or implementations may be omitted, performed in a different sequence, or combined as desired or appropriate.

In one embodiment, upon a link between the browser application and the user account being established, the return token issued by the server and stored at the browser vendor indicating the link may be periodically, constantly or intermittently, or on an on-demand basis, refreshed.

At step 702, the browser service server 120 may sent client ID, grant type (request for a refresh token), redirect URI, and/or the like, together with a refresh token request at step 704 to the server 130. At step 706, the server 130 may validate the client context, e.g., based on the client ID, current return token, etc., and perform risk check of a browser application corresponding to the client ID.

At step 708, the server 130 may generate and return a refresh token when the risk check is successful. In this case, the browser service server 120 may receive and store the refresh token at step 710.

Alternatively, the server 130 may decline the refresh token request, or opt to step-up the user for risk challenge, as described in a similar manner in FIGS. 4A-4B.

FIGS. 8A-8H provide a work flow of example browser application pages illustrating the process of setting up a link between the browser application and the user account, according to one embodiment. The example browser application pages shown in FIGS. 8A-8H may correspond to a user side process at the browser application 115 of process 300 described in relation to FIGS. 3A-3B.

Figure 8A:
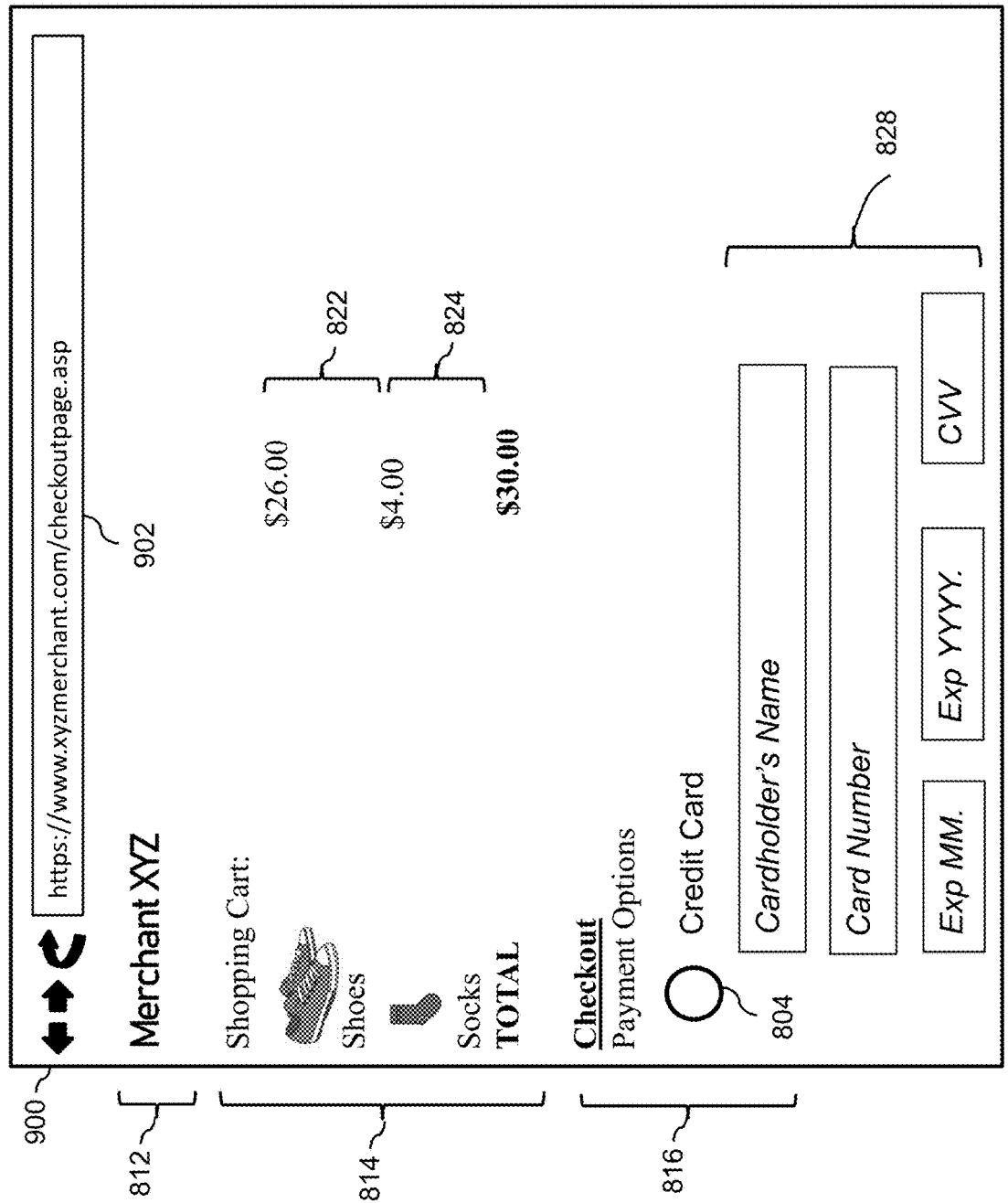
FIGS. 8A-8H provide a work flow of example browser application pages illustrating the process of setting up a link between the browser application and the user account, according to one embodiment.

Starting at FIG. 8A, the browser application window 900 includes an address bar 902 illustrating that the browser application is accessing a merchant website. The merchant website shows a transaction page including the merchant name 812, the items that the user intend to purchase 814, the item price 822 corresponding to each item, and the total transaction amount 824. The transaction page further shows a checkout option 816, which includes a payment option 804 of credit card. For example, data fields 828 shows that for credit card checkout, the user needs to fill in cardholder's name, card number, expiration date and the CVV code.

Figure 8B:
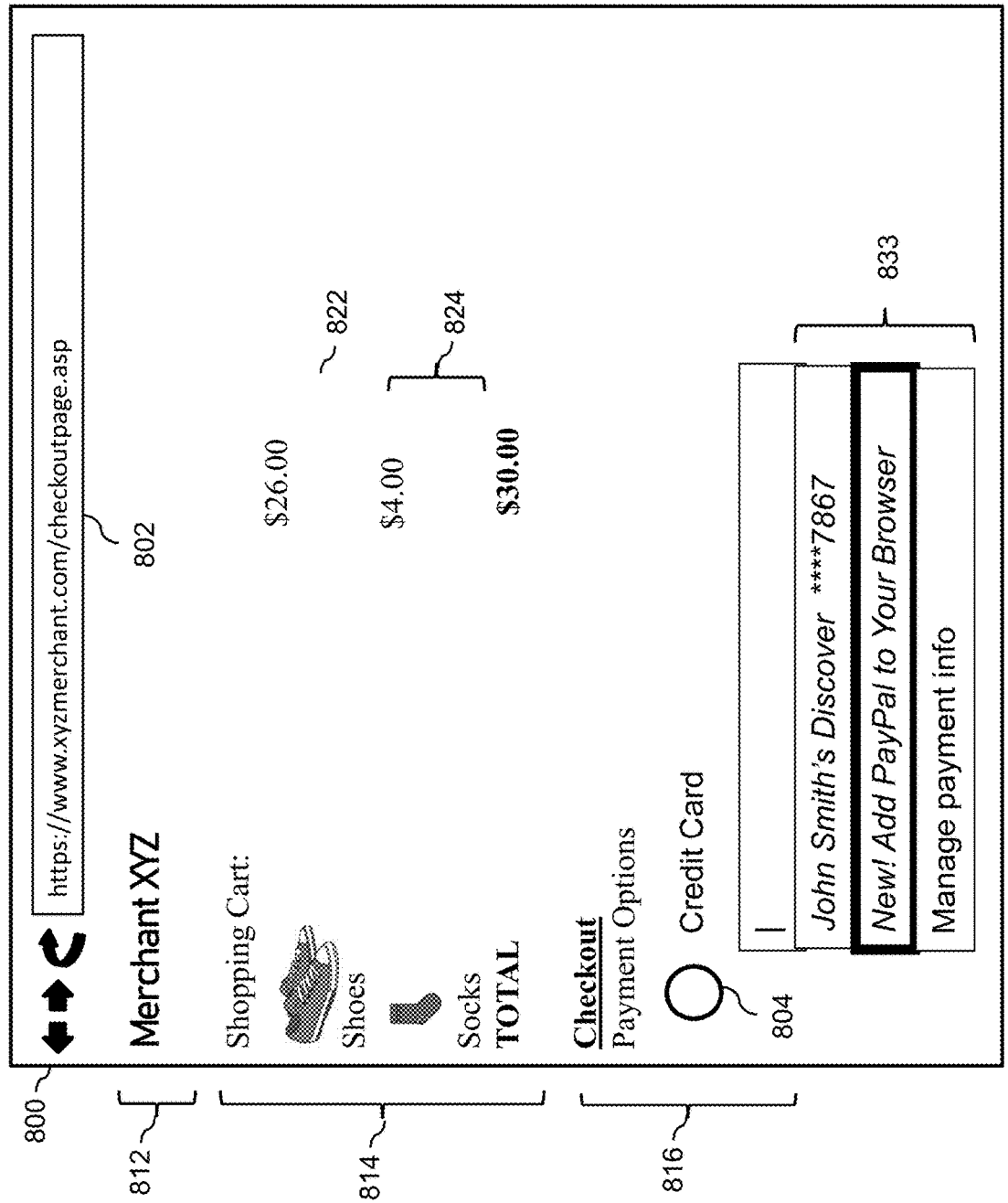

Continuing on with FIG. 8B, the browser window 900 shows a drop-down list widget 833 at the data field cardholder's name. Specifically, the drop-down list shows payment or management options that is associated with the browser application. For example, the user can choose a credit card associated with "John Smith" that is previously stored with the browser application from the drop-down list 833. For another example, the user can choose to "add PayPal to the browser" from the drop-down list 833.

Figure 8C:
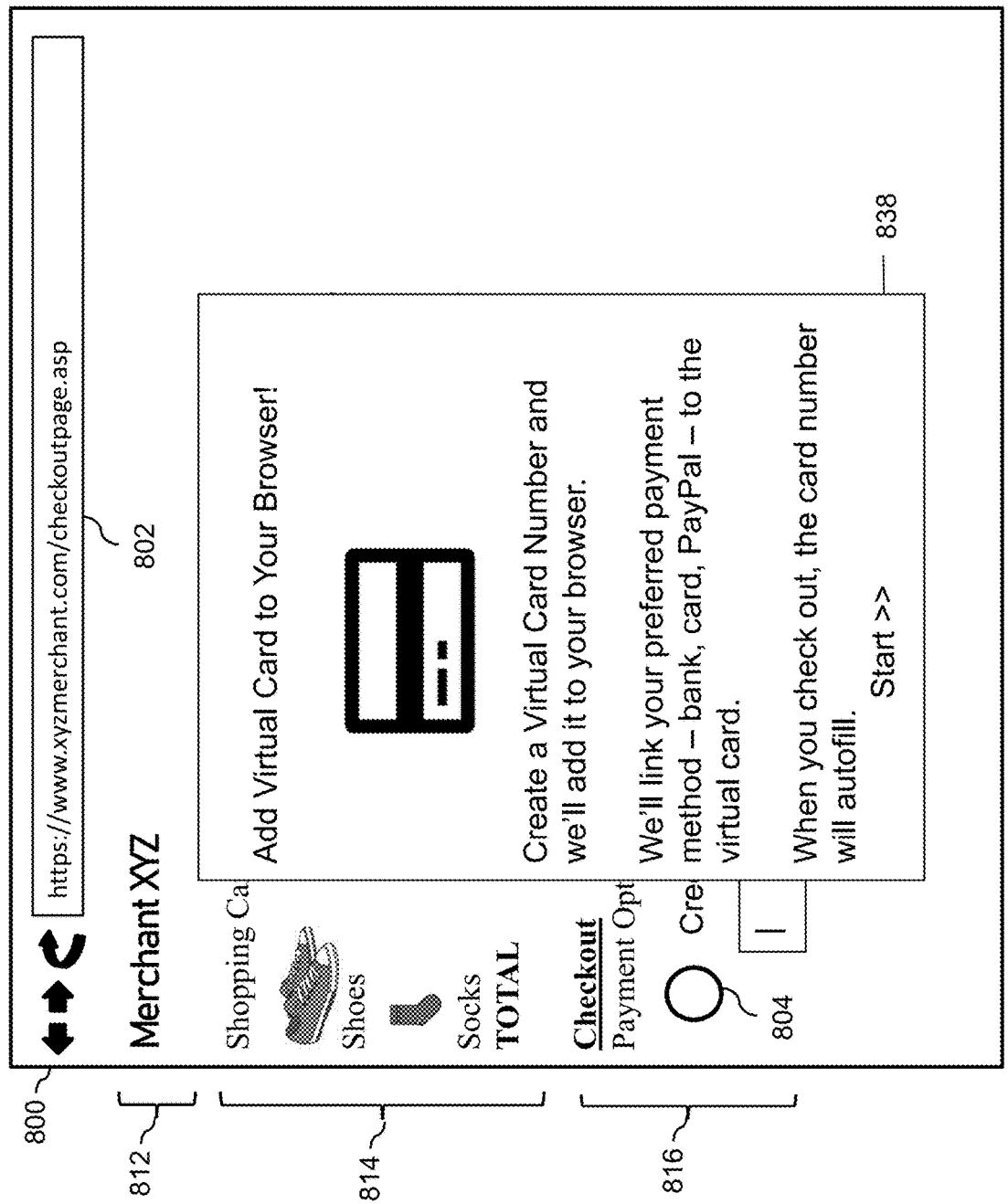

Continuing on with FIG. 8C, the browser window 900 shows a pop-up widget 838 for starting to link the browser application and the user account of the user. For example, the pop-up widget 838 displays instructions for a user to continue to create a virtual card number and add the virtual card number to the browser.

Figure 8D:
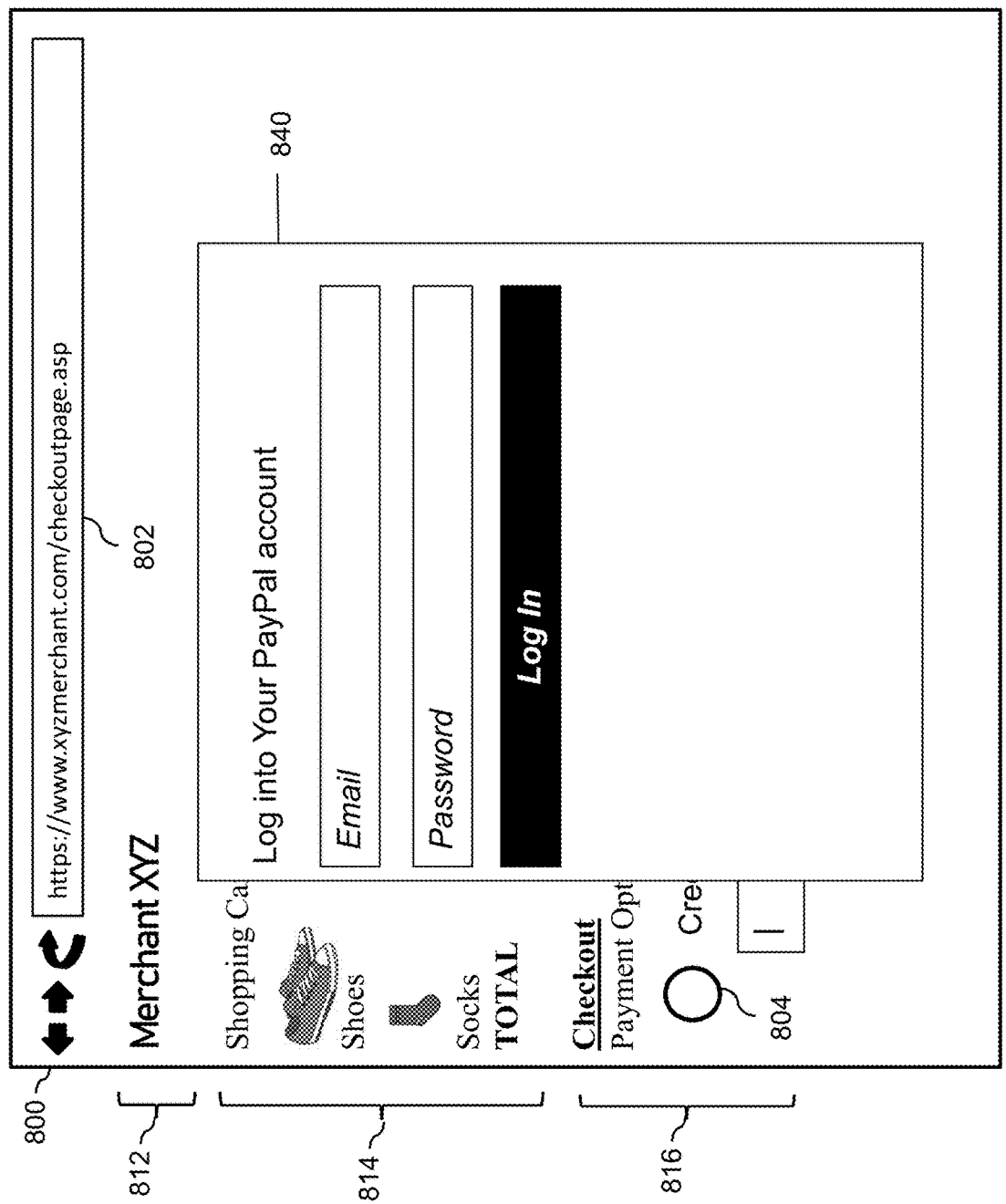

Continuing on with FIG. 8D, when the user opts to "start" to create a virtual card from pop-up widget 838 in FIG. 8C, the pop-up widget 840 may provide a login box for the user to log into the web service of the server.

Figure 8E:
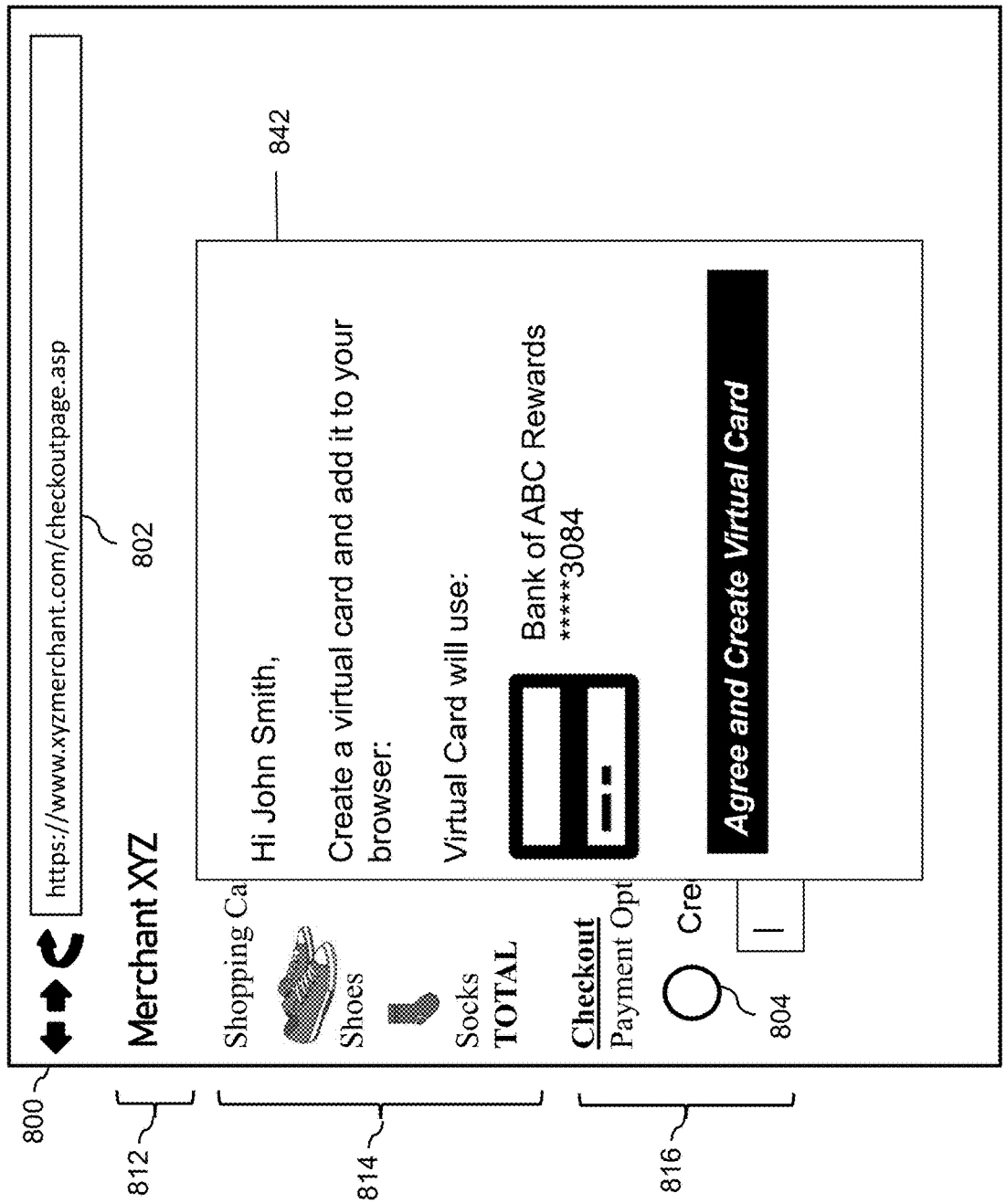

Continuing on with FIG. 8E, once the user successfully logs into the user account at the server, the pop-up widget 842 may display an information page relating to virtual card generation, for example, the account that the virtual card is generated from (e.g., "Bank of ABC Rewards" credit card, etc.). The pop-up widget 842 may further provide the option for the user to "agree and create virtual card."

Figure 8F:
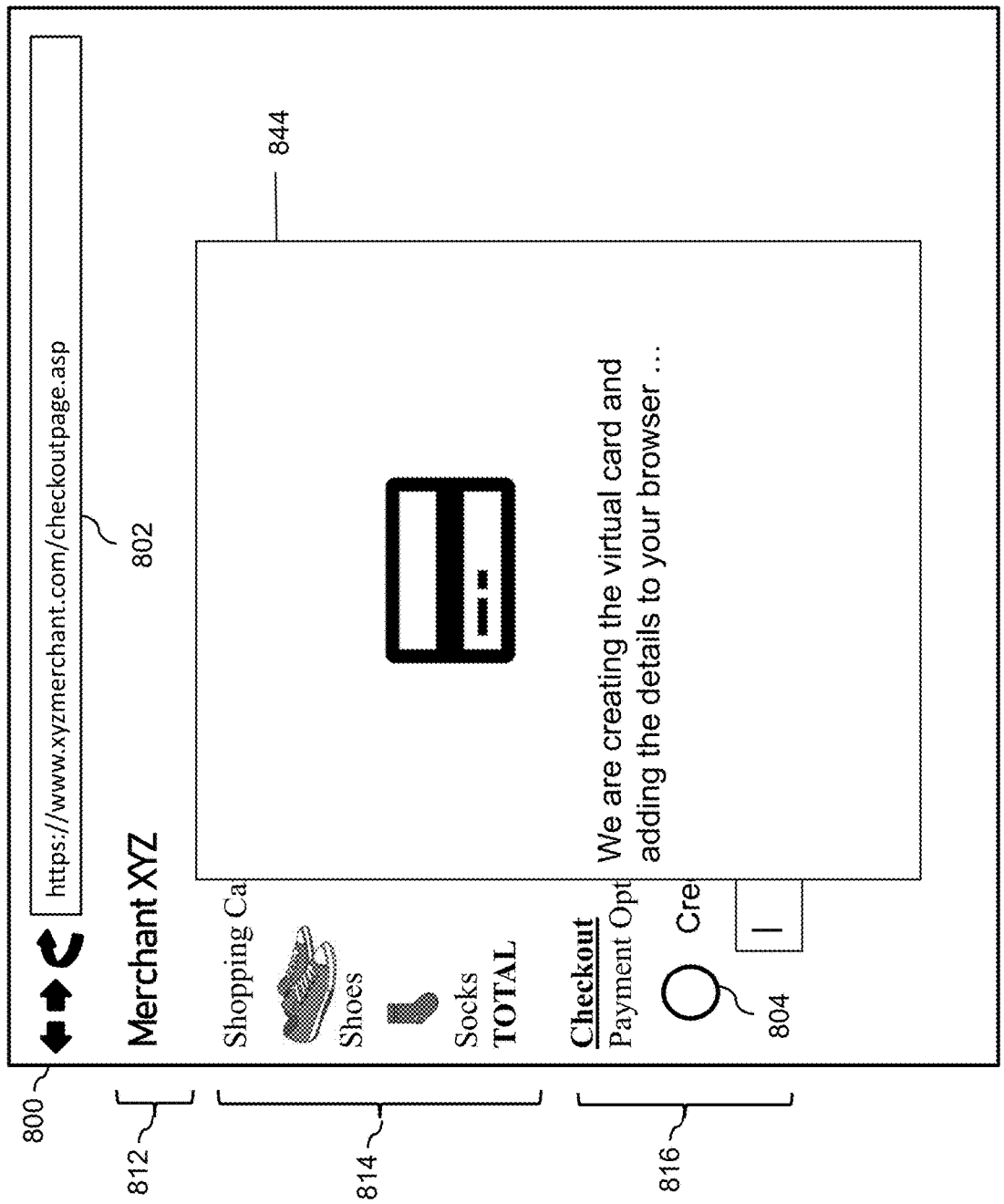

Continuing on with FIG. 8F, after the user opts to create a virtual card from pop-up widget 842 in FIG. 8E, the pop-up widget 844 shows that a virtual card is being created and details are being added to the browser. For example, process 300 shown in FIGS. 3A-3B illustrates the interaction between the browser application 115 at the user side, the browser service server 120, and the server 130 to create a virtual card and add the details of the virtual card to the browser application.

Figure 8G:
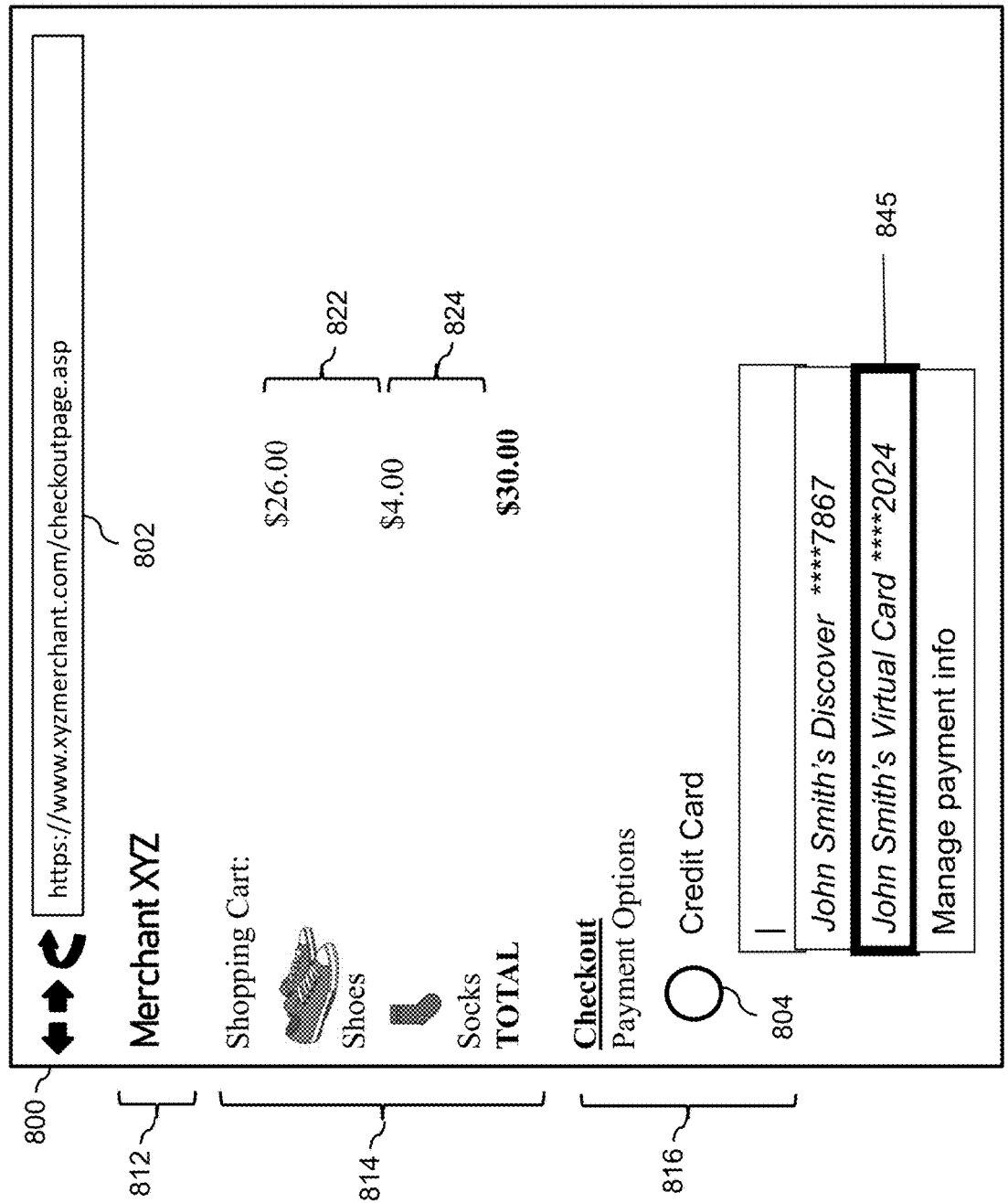

Continuing on with FIG. 8G, when the virtual card is successfully created and is added to the browser application, the drop-down list at the card information field may provide a new option showing the virtual card 845.

Figure 8H:
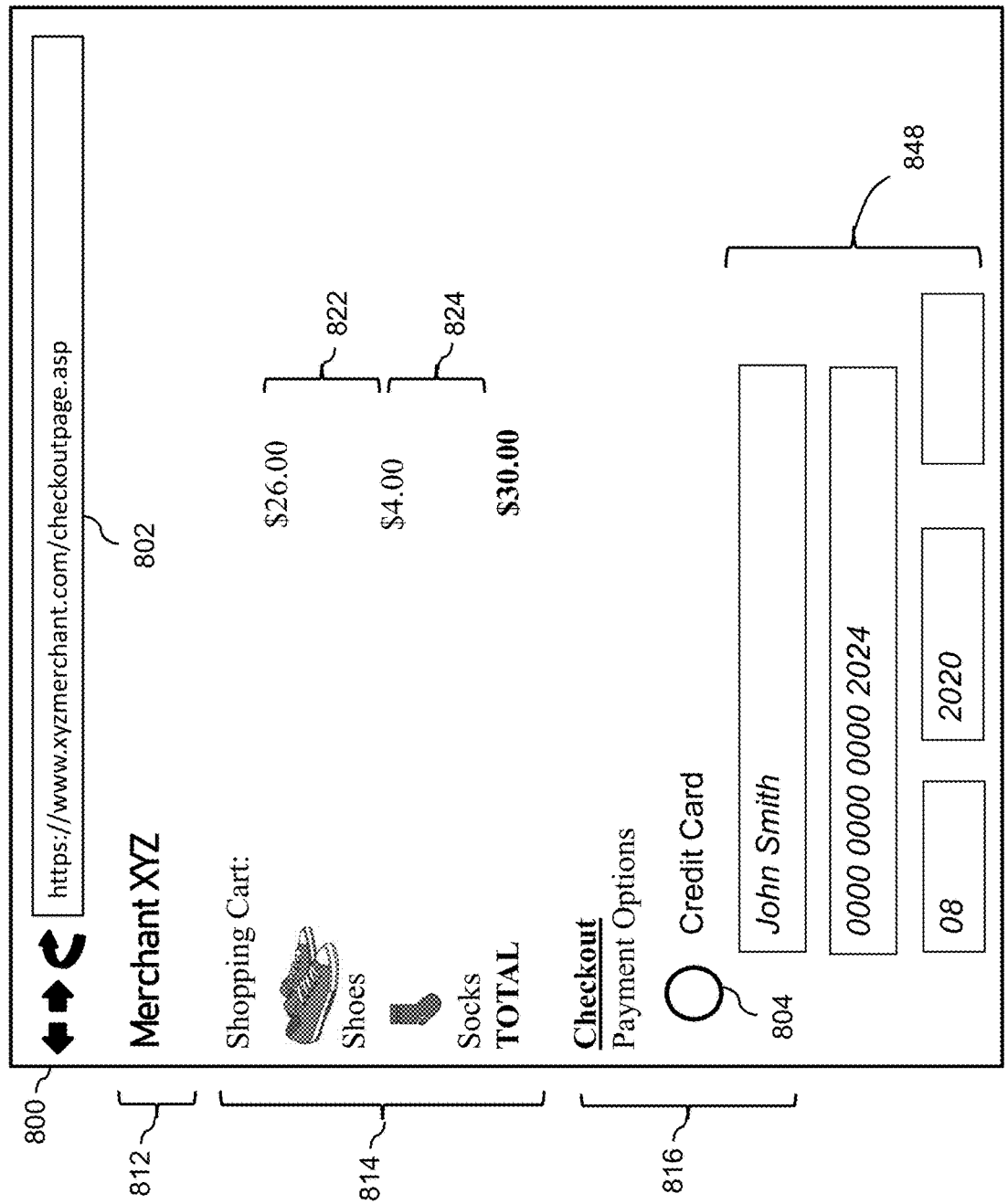

Continuing on with FIG. 8H, upon user selecting the virtual card option 845 in FIG. 8G, the browser window 800 may automatically populate the payment data fields 848 with retrieved virtual card information. In some implementation, the browser window 800 provide a pop-up widget 850 that displays retrieved virtual card information, such as the masked card number (e.g., only showing the last 4 digits), the expiration date and the CVV or CSC.

In some implementations, the browser application may not automatically populate the CSC code into the payment data fields 848, but may request the user to manually enter the CSC code. For example, the CSC or the CVV code may be displayed via a widget within the browser window for the user to manually enter the CSC or the CVV code. In some implementations, to further enhance security of the virtual card usage, the server may send the CSC code to the user using a different communication protocol, such as but not limited to email, text messages, voicemail, and/or the like.

For another example, upon automatically populating the cardholder name, virtual card number, and expiration date with the payment data fields at 848, the browser window 800 may provide a callout widget at the card number data field once the user engages with the card number data field by placing the cursor on the field. The callout widget may display the CSC or CVV code of the virtual card such that the user may manually enter the CSC or CVV code into the data field to proceed with the transaction.

For another example, upon engaging with the CSC or CVV data field, e.g., by clicking on the blank field, the user may be re-directed to log into the PAYPAL® account which may automatically fill the CSC or CVV code. After the browser window 800 autofills payment data on the transaction page, the user may submit and complete the purchase order with the merchant website.

Figure 9A:
FIGS. 9A-9B provide a work flow of example browser application pages illustrating the process of revoking a link between the browser application and the user account when the user logs into the browser application with the browser vendor, according to one embodiment.
Figure 9B:
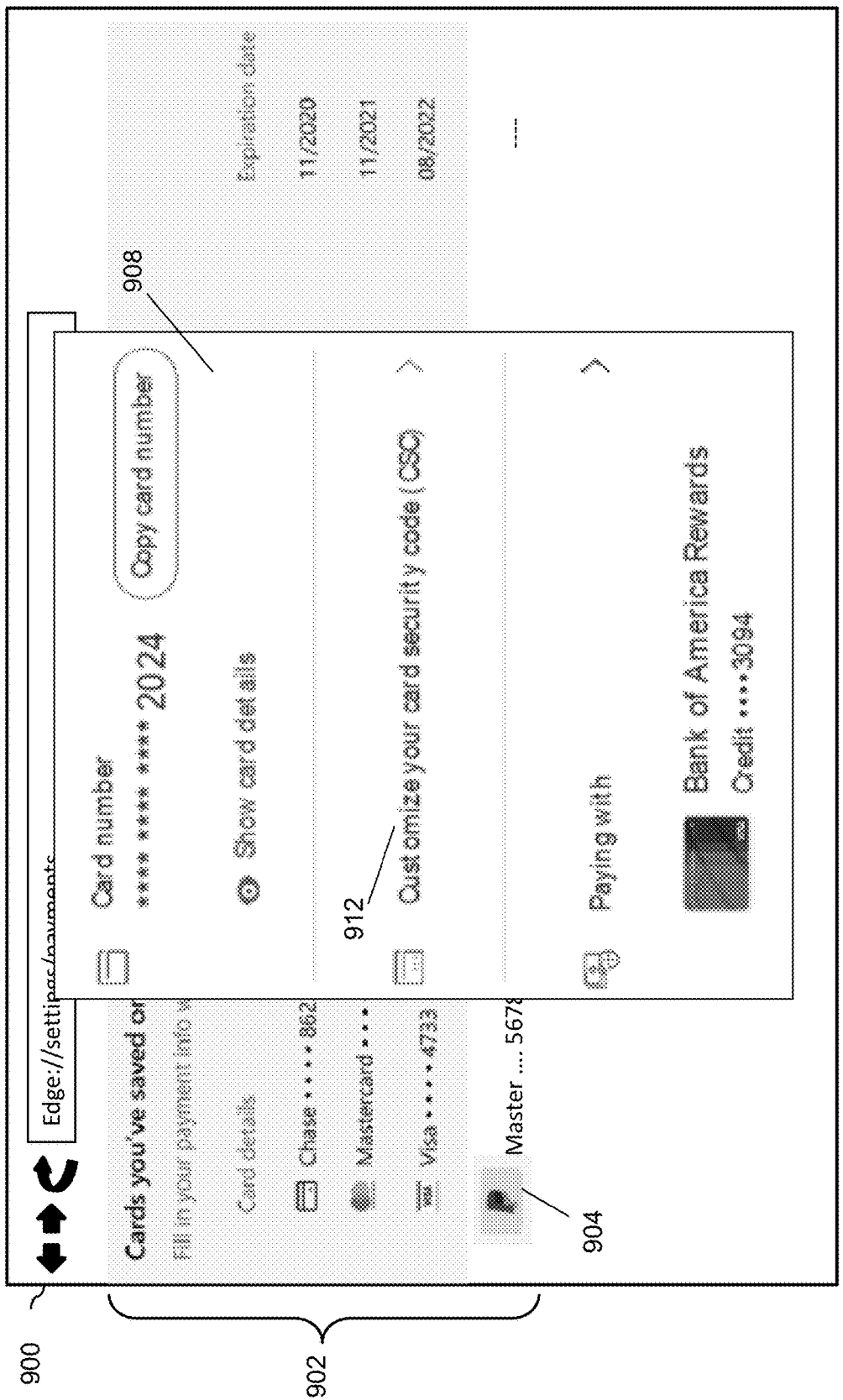

FIGS. 9A-9B provide a work flow of example browser application pages illustrating the process of revoking a link between the browser application and the user account when the user logs into the browser application with the browser vendor, according to one embodiment. The example browser application pages shown in FIGS. 9A-9B may correspond to a user side process at the browser application 115 of process 600 described in relation to FIG. 6.

Starting at FIG. 9A, browser window 900 provides a screen when the user logs into his or her browser application with the browser vendor, e.g., MICROSOFT® EDGE® in this example. Browser window 900 may display a list of cards 902 that are saved with the browser. For example, the card payment options shown at list 902 may be saved in the extension of the browser, or with the user profile stored at the browser vendor. The list 902 may include various credit cards, and/or a virtual card 904 that is linked to the browser application from the user account, e.g., PAYPAL® account at PAYPAL® server, of the user. The virtual card information is not stored at the browser window 900, or at the browser vendor (e.g., MICROSOFT® EDGE® server in this example).

In one implementation, a user may select the "view card detail" option 905 to view the detail of the virtual card, or to choose "unlink card" option 906 to revoke the virtual card linking within the browser window 900.

Continuing on with FIG. 9B, browser window 900 shows a pop-up window 908 when the "view card detail" option 905 is selected in FIG. 9A. Pop-up window 908 may display the masked virtual card number, the CSC code, and the bank card that is associated with the virtual card. In one implementation, the pop-up window 908 may provide an option 912 to customize the CSC code. For example, the user may select the option 912 to generate a randomized CSC code to replace the currently existing CSC code, and/or the like. For another example, the user may configure when and how often a randomized CSC code is generated to replace the previous version, e.g., per each transaction, per each transaction with an unprecedented merchant, every week, and/or the like.

Figure 10:
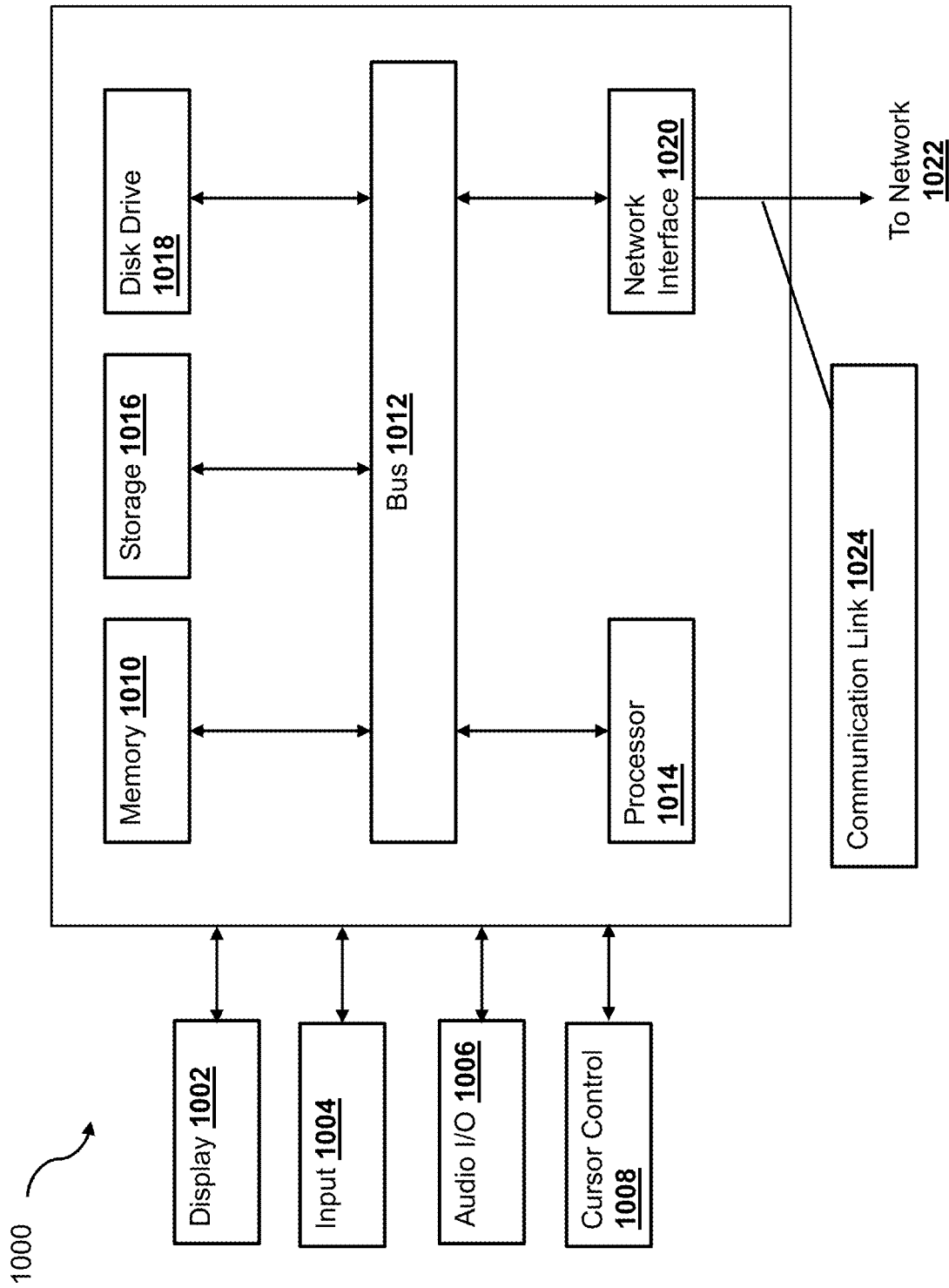
FIG. 10 is a block diagram of a computer system suitable for implementing one or more components shown in FIGS. 1-2 and performing one or more processes shown in FIGS. 3A-7, and displaying the screens shown in FIGS. 8A-9B, according to an embodiment.

FIG. 10 is a block diagram of a computer system suitable for implementing one or more components shown in FIGS. 1-2 and performing one or more processes shown in FIGS. 3A-7, and displaying the screens shown in FIGS. 8A-10B, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 1000 in a manner as follows.

The computer system 1000 includes a bus 1012 or other communication mechanism for communicating information data, signals, and information between various components of the computer system 1000. The components include an input/output (I/O) component 1004 that processes a user (i.e., sender, recipient, service provider) action, such as selecting keys from a keypad/keyboard, selecting one or more buttons or links, etc., and sends a corresponding signal to the bus 1012. The I/O component 1004 may also include an output component, such as a display 1002 and a cursor control 1008 (such as a keyboard, keypad, mouse, etc.). The display 1002 may be configured to present a login page for logging into a user account or a checkout page for purchasing an item from a merchant. An optional audio input/output component 1006 may also be included to allow a user to use voice for inputting information by converting audio signals. The audio I/O component 1006 may allow the user to hear audio. A transceiver or network interface 1020 transmits and receives signals between the computer system 1000 and other devices, such as another user device, a merchant server, or a service provider server via network 1022. In one embodiment, the transmission is wireless, although other transmission mediums and methods may also be suitable. A processor 1014, which can be a micro-controller, digital signal processor (DSP), or other processing component, processes these various signals, such as for display on the computer system 1000 or transmission to other devices via a communication link 1024. The processor 1014 may also control transmission of information, such as cookies or IP addresses, to other devices.

The components of the computer system 1000 also include a system memory component 1010 (e.g., RAM), a static storage component 1016 (e.g., ROM), and/or a disk drive 1018 (e.g., a solid-state drive, a hard drive). The computer system 1000 performs specific operations by the processor 1014 and other components by executing one or more sequences of instructions contained in the system memory component 1010. For example, the processor 1014 can perform the position detection of webpage elements described herein according to the process 300.

Logic may be encoded in a computer readable medium, which may refer to any medium that participates in providing instructions to the processor 1014 for execution. Such a medium may take many forms, including but not limited to, non-volatile media, volatile media, and transmission media. In various implementations, non-volatile media includes optical or magnetic disks, volatile media includes dynamic memory, such as the system memory component 1010, and transmission media includes coaxial cables, copper wire, and fiber optics, including wires that comprise the bus 1012. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1000. In various other embodiments of the present disclosure, a plurality of computer systems 1000 coupled by the communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method performed by a server hosting a browser service application programming interface (API) and a web-service API, the method comprising:
   receiving, at the server hosting a user account for a user and via the browser service API corresponding to a browser application on a user device of the user, a first autofill request for automatically populating payment information for a transaction page with the browser application;
   providing, via the web service API of the server, a user consent request to the browser application that is engaged by the user, in response to the received first autofill request;
   receiving, via the web service API of the server and from the browser application, a user consent indication;
   establishing, by the server and via the browser service API of the server, a link between the browser application at the user device and the user account hosted at the server in response to the user consent indication;
   generating, at the server, a virtual card based on the user account; and
   sending, from the server, via the browser service API and to the browser application, following the link between the browser application and the user account, card information relating to the virtual card that automatically and directly populates the transaction page at the browser application.

2. The method of claim 1, wherein the first autofill request includes a tracking identifier, and the method further comprises:
   sending, to the web service API, an API call including the trancing identifier and a redirect link for a login page to the server; and
   receiving user login credentials to log into the user account,
      wherein the user consent request is provided on a user consent page after the user logs into the user account.

3. The method of claim 1, wherein the browser application and the user account are linked by performing:
   receiving, from the browser API, an encryption key for the virtual card;
   generating a return token in response to receiving an authorization code or the encryption key;
   encrypting the virtual card information by the encryption key; and
   providing the encrypted virtual card information and the return token to the browser API, wherein the return token is stored at a browser vendor server hosting the browser API.

4. The method of claim 3, further comprising:
   after the browser application and the user account are linked:
      receiving, via a browser API, a second autofill request indicating user identifying information for the virtual card on the transaction page of a merchant server,
         wherein the second autofill request includes the stored return token from the browser API;
      validating, by the server, the return token prior to providing card information relating to the virtual card; and
      sending the card information relating to the virtual card to the browser application upon validation.

5. The method of claim 1, further comprising:
   obtaining, via the browser API, risk data associated with the browser application;
   determining, based on the obtained risk data, a risk assessment level associated with the first autofill request;
   in response to determining that the risk assessment level is within a first range, sending the card information relating to the virtual card for automatically populating the transaction page with the merchant server;
   in response to determining that the risk assessment level is within a second range, sending a decline message to the browser application; and
   in response to determining that the risk assessment level is within a third range:
      sending a risk challenge to the browser application instantiated at the user device; and
      in response to receiving a correct response to the risk challenge from the browser application, sending the card information associated with the virtual card to the browser application for automatically populating the transaction page with the merchant server.

6. The method of claim 1, wherein the generating the virtual card based on the user account for the user comprises:
   generating dynamic card information for the user account of the user in response to each autofill request,
      wherein the dynamic card information includes any of:
         a card number that is dynamically generated per each transaction; and
         a card security code that is dynamically generated per each transaction.

7. The method of claim 6, wherein the dynamic card information is generated by applying a random number generator.

8. The method of claim 1, wherein the card information relating to the virtual card is sent to the browser application to automatically populate the transaction page at the browser application without being stored by the browser application or a merchant server hosting the transaction page.

9. The method of claim 1, further comprising:
   receiving a revocation request to revoke the link between the user account and the browser application;
   invalidating a return token, which is generated at the server when the link between the user account and the browser application is established; and
   sending, to the browser service API, a notification event that the return token is invalidated.

10. The method of claim 9, wherein the revocation request is received from the webservice API of the server after the server has logged the user into the user account.

11. The method of claim 9, wherein the revocation request is received from the browser service API when the user has logged into a browser session of the browser application.

12. The method of claim 1, further comprising:
   receiving a refresh token request from the browser service API;
   validating, at the server, the link between the user account and the browser application;
   generating a refresh token upon validation; and
   sending the refresh token to the browser service API.

13. The method of claim 12, wherein the link between the user account and the browser application is validated by:
reassessing a risk associated with the browser application;
providing, to the browser application, a risk challenge when the reassessed risk is greater than a threshold; and
validating the link between the user account and the browser when a correct answer is received in response to the risk challenge.

14. A system at a server hosting a browser service application programming interface (API) and a web service API, the system comprising:
a memory configured to store a user account and a plurality of processor-executable instructions;
a communication interface configured to receive, a via the browser service API corresponding to a browser application on a user device of the user, a first autofill request for automatically populating payment information for a transaction page with the browser application; and
a processor configured to read and execute the plurality of processor-executable instructions from the memory to:
provide, via the web service API, a user consent request to the browser application that is engaged by the user, in response to the received first autofill request, and
receive, via the web service API and from the browser application, a user consent indication; a processor configured to:
establish, via the browser service API, a link between the browser application at the user device and the user account hosted at the server in response to the user consent indication,
generate virtual payment information that is linked to the user account, and
wherein the communication interface is configured to send, via the browser service API and to the browser application, following the link between the browser application and the user account, the virtual payment information for automatically populating the transaction page at the browser application.

15. The system of claim 14, wherein the processor is further configured to link the browser application and the user account by:
receiving, from the browser API, an encryption key for the virtual payment information;
generating a return token in response to receiving an authorization code or the encryption key;
encrypting the virtual payment information by the encryption key; and
providing the encrypted virtual payment information and the return token to the browser API, wherein the return token is stored at a browser vendor server hosting the browser API.

16. The system of claim 15, wherein the processor is further configured to:
after the browser application and the user account are linked:
receive, via the browser API, a second autofill request indicating user identifying information for the virtual card on the transaction page of a merchant server,
wherein the second autofill request includes the stored return token from the browser API;
validate the return token prior to providing card information relating to the virtual card; and
send the card information relating to the virtual card to the browser application upon validation.

17. The system of claim 14, wherein the processor is further configured to generate the virtual payment information by:
generating dynamic card information for the user account of the user in response to each autofill request,
wherein the dynamic card information includes any of:
a card number that is dynamically generated per each transaction; and
a card security code that is dynamically generated per each transaction.

18. The system of claim 14, wherein the virtual payment information is sent to the browser application to automatically populate the transaction page at the browser application without being stored by the browser application or a merchant server hosting the transaction page.

19. A non-transitory processor-readable medium storing processor-executable instructions, the instructions being executed by a processor to:
receive, at a server hosting a user account for a user, and via the browser service application programming interface (API) corresponding to a browser application on a user device of the user, a first autofill request for automatically populating payment information for a transaction page with the browser application, wherein the server further hosts the browser service application API and a web service API;
provide, via the web service API of the server, a user consent request to the browser application that is engaged by the user, in response to the received first autofill request;
receive, via the web service API of the server and from the browser application, a user consent indication;
establish, by the server and via the browser service API, a link between the browser application at the user device and the user account hosted at the server in response to the user consent indication;
generate, at the server, virtual payment information based on the user account; and
send, from the server, via the browser service API and to the browser application, the virtual payment information following the link between the browser application and the user account to automatically populate the transaction page at the browser application.

20. The non-transitory processor-readable medium of claim 19, wherein the virtual payment information includes any of:
a card number that is dynamically generated per each transaction; and
a card security code that is dynamically generated per each transaction.

* * * * *